United States Patent
van der Ent

(10) Patent No.: US 9,155,333 B2
(45) Date of Patent: Oct. 13, 2015

(54) APPARATUSES AND METHODS FOR THE PRODUCTION OF SANDWICH FOOD ITEMS

(71) Applicant: Hans van der Ent, Helmond (NL)

(72) Inventor: Hans van der Ent, Helmond (NL)

( * ) Notice: Subject to any disclaimer, the term of this patent is extended or adjusted under 35 U.S.C. 154(b) by 0 days.

(21) Appl. No.: 14/073,286

(22) Filed: Nov. 6, 2013

(65) Prior Publication Data
US 2014/0116266 A1    May 1, 2014

Related U.S. Application Data

(63) Continuation of application No. 12/577,540, filed on Oct. 12, 2009, now Pat. No. 8,578,842.

(51) Int. Cl.
*A23P 1/08* (2006.01)
*A21C 15/00* (2006.01)
*A21C 15/02* (2006.01)

(52) U.S. Cl.
CPC ............... *A23P 1/086* (2013.01); *A21C 15/002* (2013.01); *A21C 15/02* (2013.01)

(58) Field of Classification Search
CPC ...................................................... A23P 1/086
USPC ............ 99/450.4, 450.7, 443 C, 537; 426/76, 426/94, 274, 275, 297, 330, 410
See application file for complete search history.

(56) References Cited

U.S. PATENT DOCUMENTS

| 2,391,937 | A |   | 1/1946 | Arvidson |
| 2,664,055 | A |   | 12/1953 | Oakes |
| 2,853,961 | A | * | 9/1958 | Oakes ........................ 99/450.4 |
| 2,868,141 | A | * | 1/1959 | Griner ........................ 99/450.4 |
| 3,340,824 | A |   | 9/1967 | Talbot |
| 3,343,504 | A |   | 9/1967 | Beik |
| 3,513,784 | A |   | 5/1970 | Kesselman |
| 3,762,305 | A |   | 10/1973 | Glackin |
| 3,782,270 | A |   | 1/1974 | Sollerud |
| 3,828,660 | A |   | 8/1974 | Mueller et al. |
| 4,098,909 | A |   | 7/1978 | Mims |
| 4,162,882 | A |   | 7/1979 | Rose |
| 4,469,021 | A |   | 9/1984 | Rose et al. |
| 4,615,264 | A |   | 10/1986 | Rose |
| 4,708,054 | A |   | 11/1987 | Newbery et al. |
| 5,320,210 | A |   | 6/1994 | Van Den Bergh et al. |
| 5,346,057 | A |   | 9/1994 | Fisher et al. |
| 5,702,245 | A | * | 12/1997 | London ........................ 432/14 |
| 5,974,958 | A |   | 11/1999 | Lilley et al. |
| 2004/0028776 | A1 |   | 2/2004 | Henrichs |

FOREIGN PATENT DOCUMENTS

| CN | 2347407 | 11/1999 |
| DE | 1162674 | 2/1964 |
| GB | 695204 | 8/1953 |
| GB | 769710 | 3/1957 |
| GB | 1287534 | 8/1972 |
| GB | 2111365 | 7/1983 |

OTHER PUBLICATIONS

Office Action dated Dec. 24, 2013 for Chinese Patent Application No. 201080056130.7.

(Continued)

*Primary Examiner* — Thien S Tran
(74) *Attorney, Agent, or Firm* — Nelson Mullins Riley & Scarborough, LLP

(57) ABSTRACT

The present invention relates to apparatuses and processes for the production of sandwich food items that include filler.

13 Claims, 23 Drawing Sheets

(56) References Cited

OTHER PUBLICATIONS

PCT Invitation to Pay Additional Fees with Annex Partial International Search dated Apr. 5, 2011 for PCT Application No. PCT/EP2010/064835.

PCT Notification Concerning Transmittal of International Preliminary Report on Patentability dated Apr. 26, 2912 and Written Opinion for PCT Application No. PCT/EP2010/064835.
Communication pursuant to Rules 161(1) and 162 EPC dated May 21, 2012 for EP Application No. 10760712.9.
First Examination Report dated Nov. 12, 2013 for EP Application No. 107670712.9.

* cited by examiner

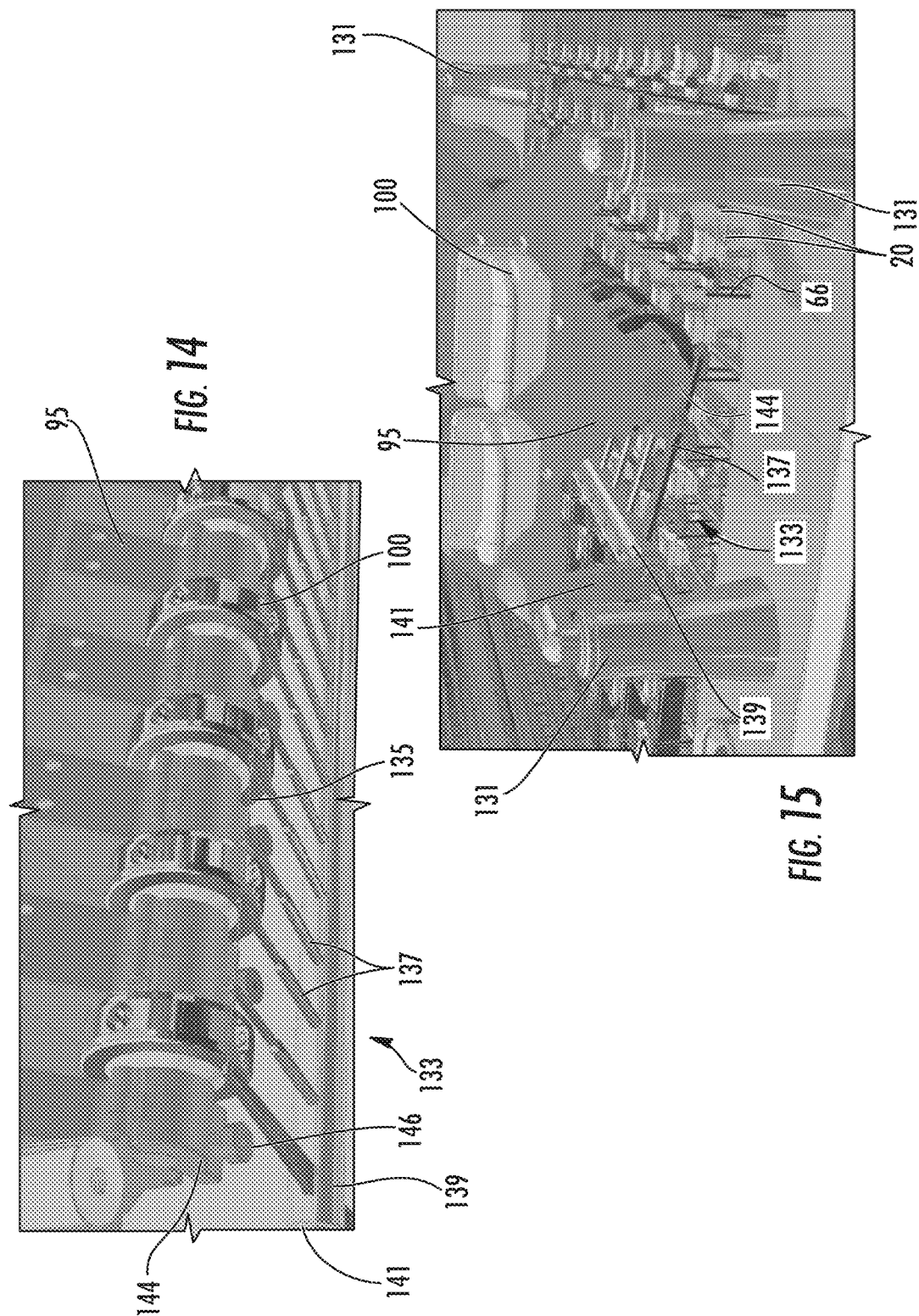

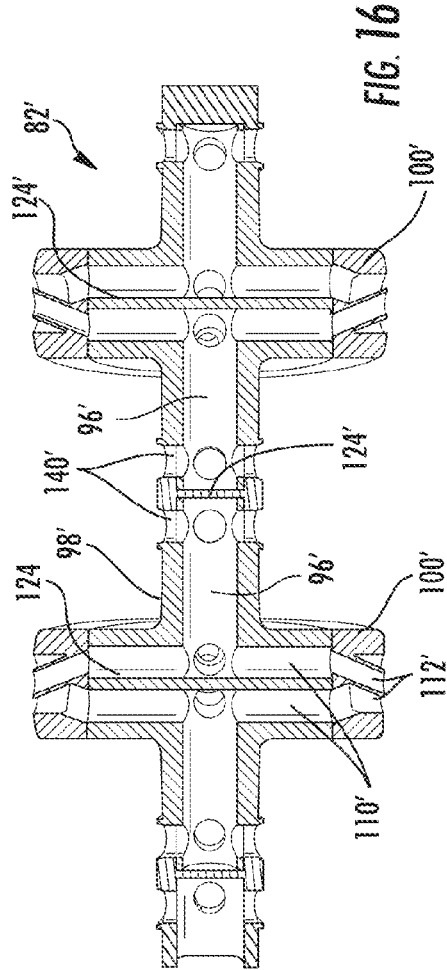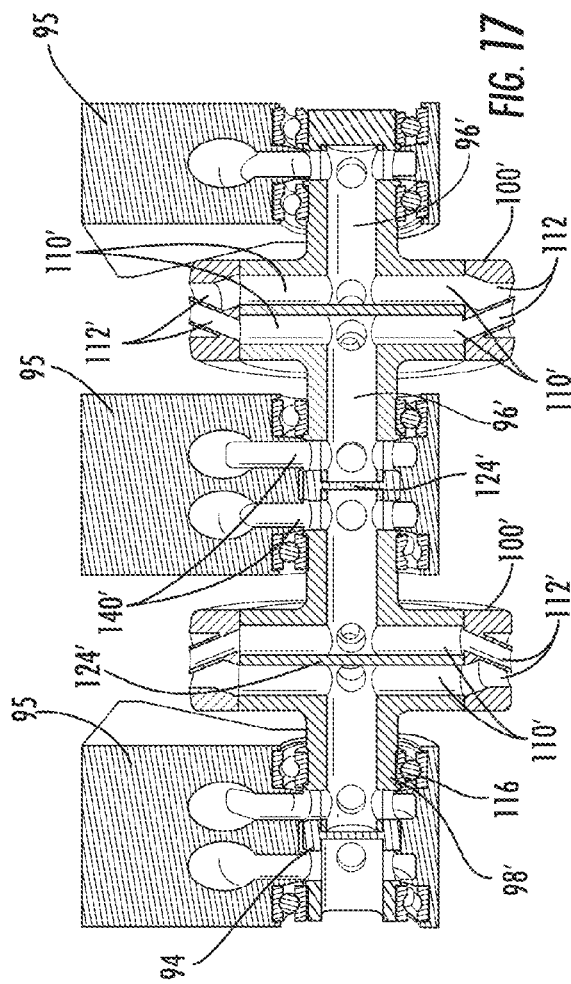

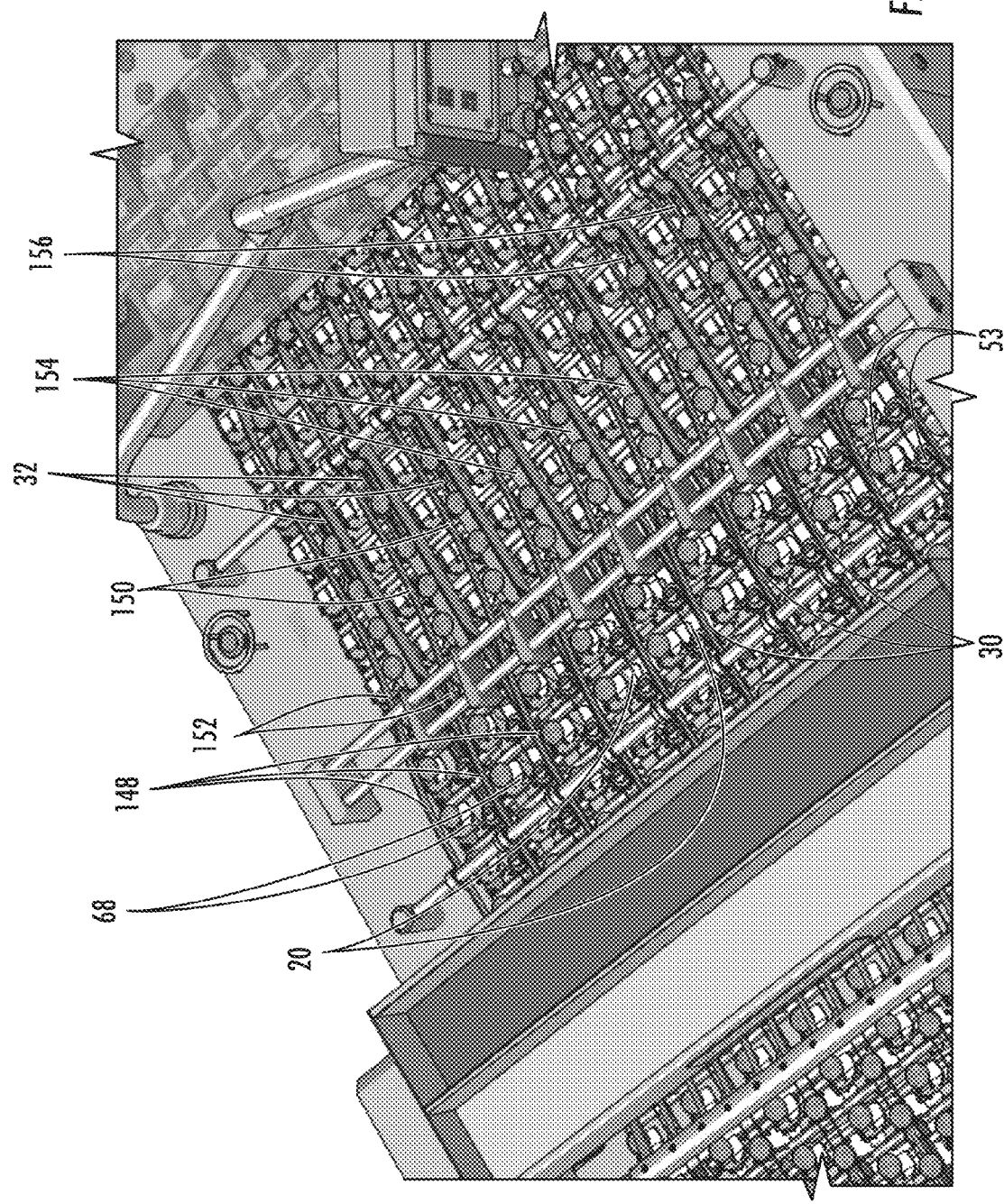

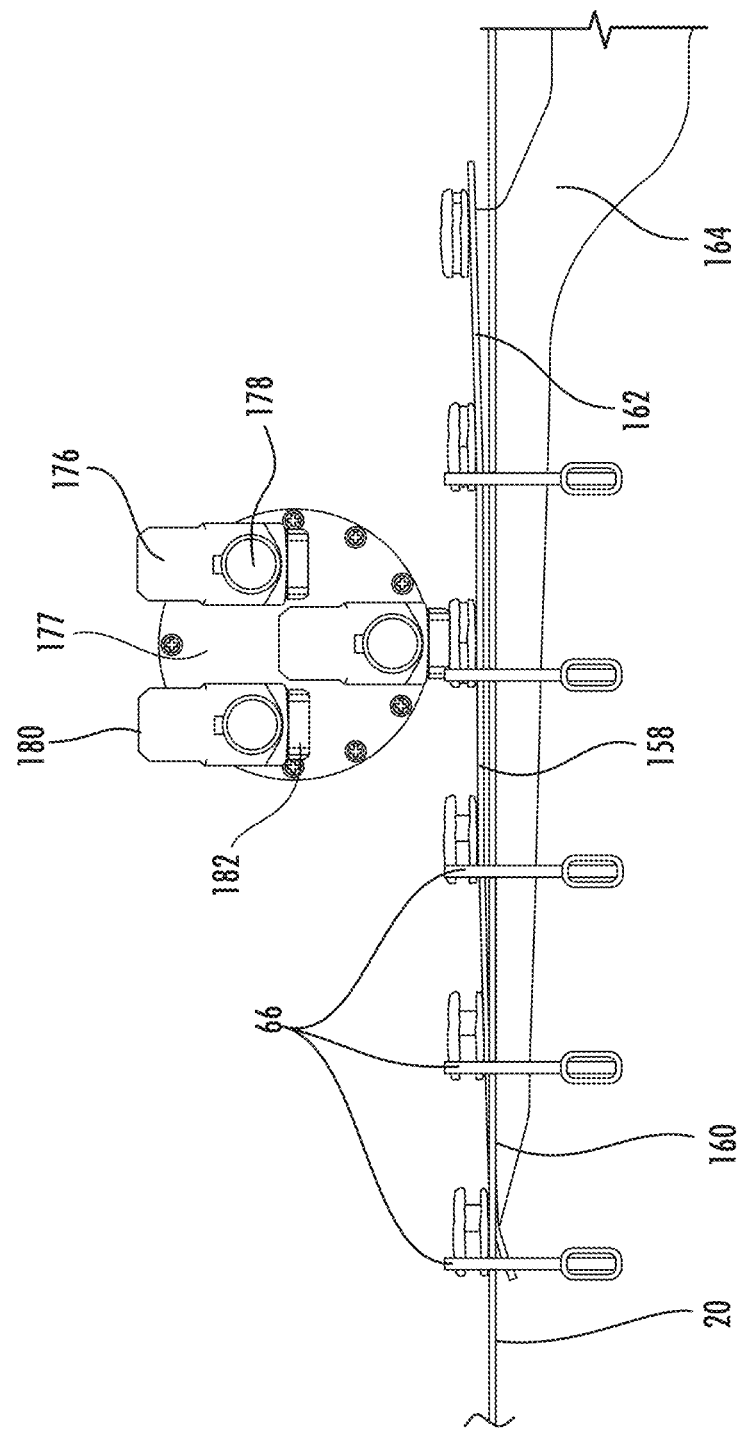

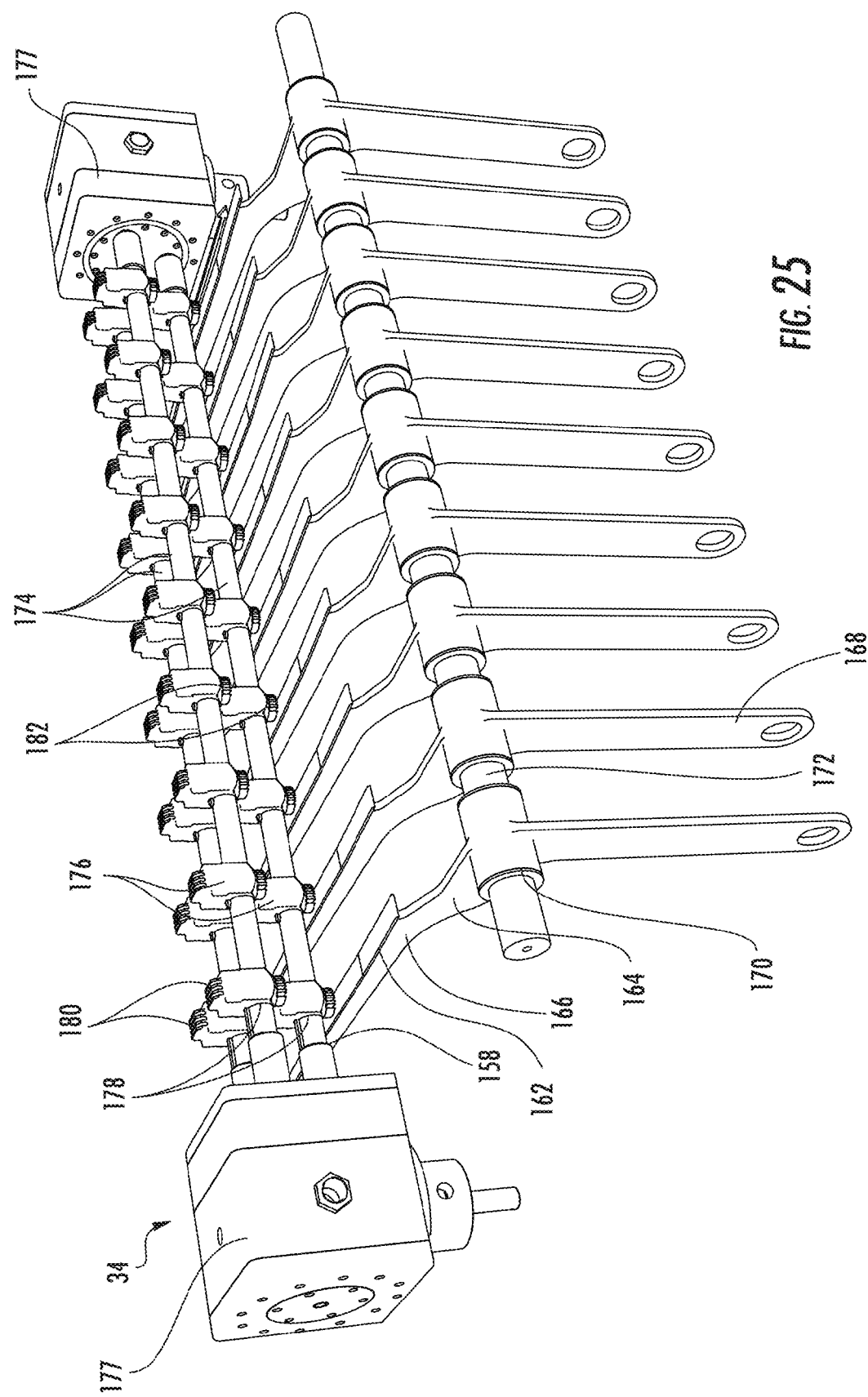

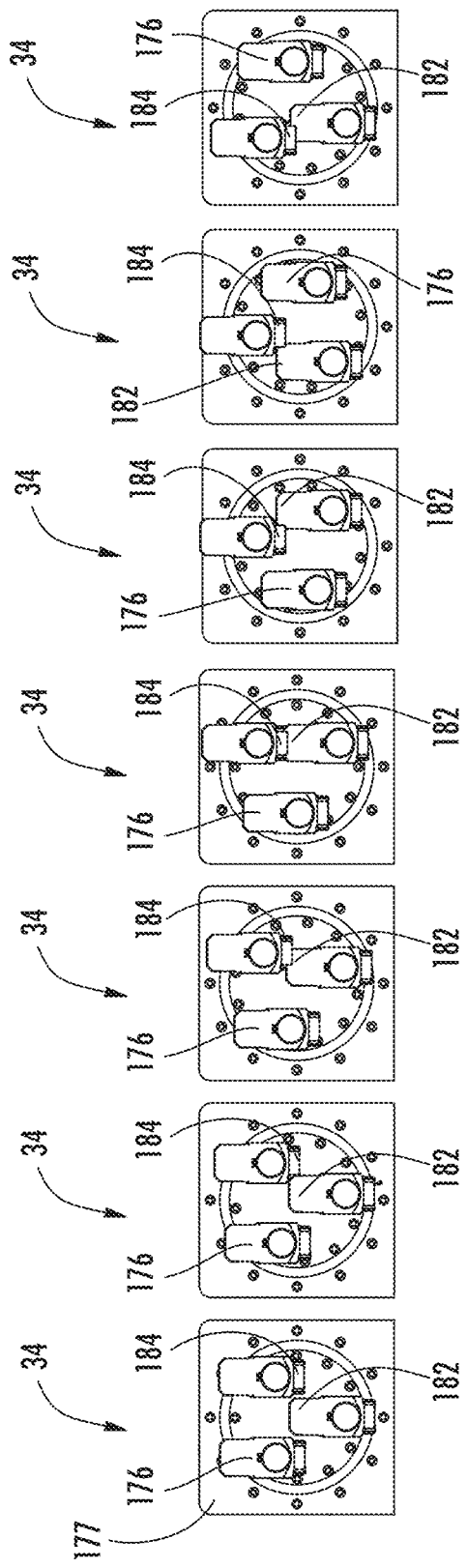

APPARATUSES AND METHODS FOR THE PRODUCTION OF SANDWICH FOOD ITEMS

CLAIM OF PRIORITY

The present invention is a continuation of U.S. patent application Ser. No. 12/577,540 filed Oct. 12, 2009, now U.S. Pat. No. 8,578,842, the entire disclosure of which is incorporated by reference.

FIELD OF THE INVENTION

The present invention relates to apparatuses and processes for the production of sandwich food items that include filler.

SUMMARY OF THE INVENTION

One embodiment of the present invention is an apparatus for the continuous production of sandwich food items including an input end for supplying a row of food items and a deposit end for receiving completed sandwich food items. The apparatus further includes a carrying mechanism extending from the input end to the deposit end and a row conveyer that includes a rail and that continuously cycles from the input end to the deposit end and is adapted to receive the row of food items from the input end. The rail includes a receiving plate that has a first end and a second end and an adjacent pair of outwardly extending arms that receive the carrying mechanism. The apparatus also includes a depositing mechanism that supplies filler to a food item. The apparatus further includes a bowed arm that includes a first end that is adapted to receive the first end of the receiving plate, a second end that is adapted to receive the second end of the receiving plate, and a curvature portion between the first end and second end of the bowed arm. The apparatus further includes a brace located above the carrying mechanism such that the brace may be received by the adjacent pair of outwardly extending arms and includes a first end adjacent to the second end of the bowed arm and a second end opposite the first end.

Another embodiment of the present invention is a method for the continuous production of sandwich food items including continuously supplying a row of food items where the row of food items includes complementary food items. The method further includes transporting the row of food items by a continuously moving row conveyer, the row conveyer including alternating adjacent receiving plates that a first complementary food item rests atop and alternating pairs of outwardly extending arms that receive a carrying mechanism, where a second complementary food item is rested atop the carrying mechanism and is transported by the pairs of outwardly extending arms. The method also includes applying filler atop a second complementary food item. The method further includes aligning the first complementary food item above the second complementary food item with the use of a bowed arm to push the first food item along the receiving plate toward the second food item and onto a brace located above the carrying mechanism. The method further includes placing the first food item atop the second food item of the carrying mechanism with the use of the outwardly extending arms to push both food items until the first food item is pushed off an end of the braced and placed atop the second food item.

The accompanying drawings, which are incorporated in and constitute a part of this specification, illustrate one or more embodiments of the invention, and together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which refers to the appended drawings, in which:

FIG. 14 is a bottom perspective view of a depositing mechanism with a harp in accordance with and embodiment of the present invention;

FIG. 15 is a side perspective view of a depositing mechanism with a harp in accordance with an embodiment of the present invention;

FIG. 16 is a front cross-sectional view of a portion of a depositing assembly in accordance with another embodiment of the present invention;

FIG. 17 is a front cross-sectional view of a portion of a depositing assembly connected to housings in accordance with an embodiment of the present invention;

FIG. 20 is a partial perspective view of an apparatus for the production of sandwich food items in accordance with an embodiment of the present invention;

FIG. 24 is a side view of a guide bracket and a compression mechanism from the apparatus for the production of sandwich food items in accordance with an embodiment of the present invention;

FIG. 25 is a perspective view of a compression mechanism and guide levers from an apparatus for the production of sandwich food items in accordance with an embodiment of the present invention; and FIGS. 26A through 26G are side views of a compression mechanism from an apparatus for the production of sandwich food items in accordance with an embodiment of the present invention, wherein the figures illustrate the rotation of compression mechanism.

Figure 1:
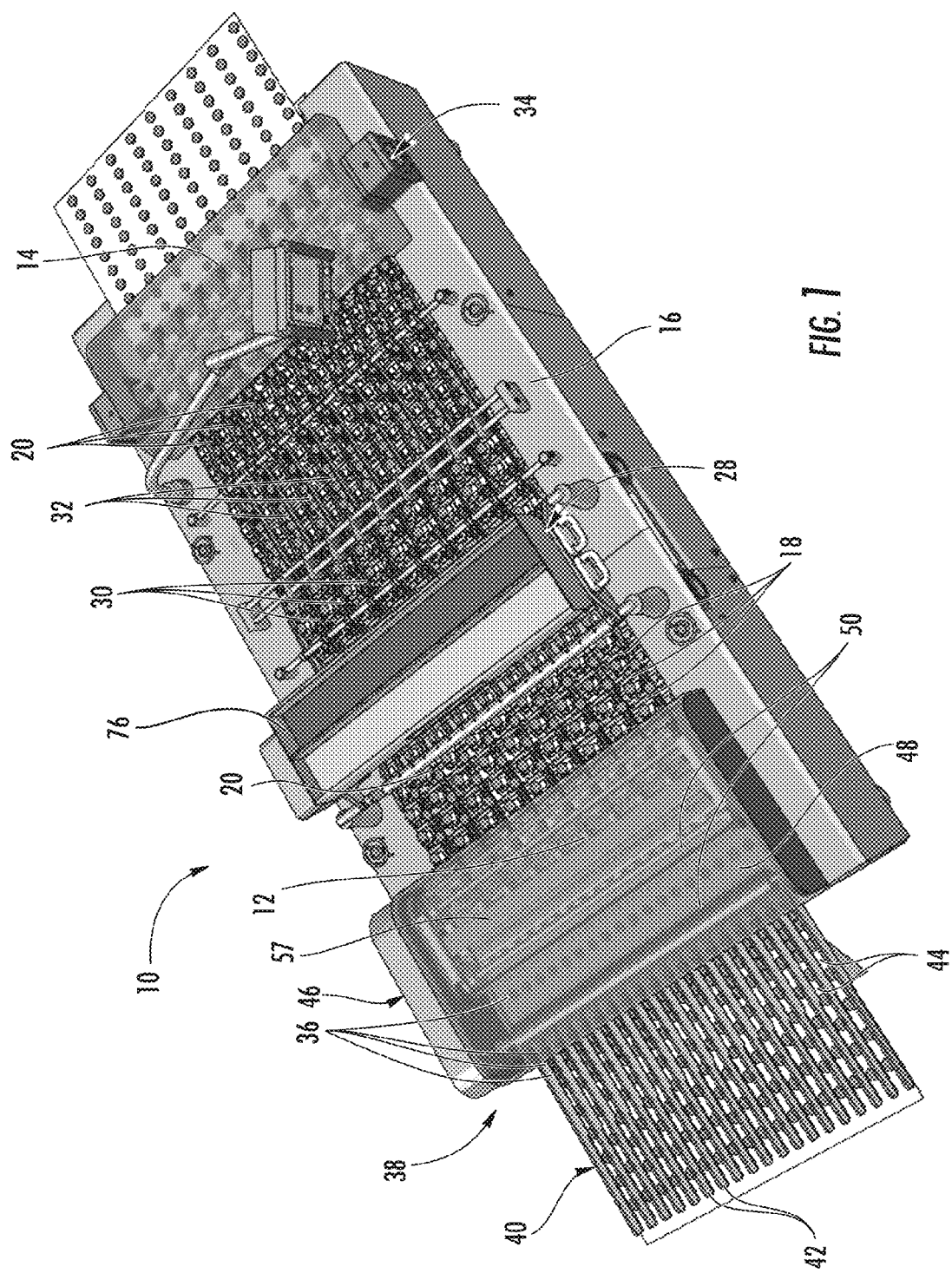
FIG. 1 is a perspective view of an apparatus for the production of sandwich food items in accordance with an embodiment of the present invention.

Repeat use of reference characters in the present specification and drawings is intended to represent same or analogous features or elements of the invention.

DETAILED DESCRIPTION OF THE INVENTION

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is directed to apparatuses and methods for the production of sandwich food items that include filler. The apparatuses of the present invention may be particularly useful in the production of sandwich cookies or crackers. Those of ordinary skill in the art will recognize, however, that the apparatuses and methods disclosed could be used to provide filings on a number of food items including cookies, crackers, wafers, bread or other food items. The apparatuses and methods of the present invention may also be used to apply any number of fillers to create the sandwich items. Again, those of ordinary skill will recognize the wide array of fillers that may be used including creams, fruit fillings, jam, jelly, peanut butter filler, cheese flavored filler and other fillers.

Figure 2:
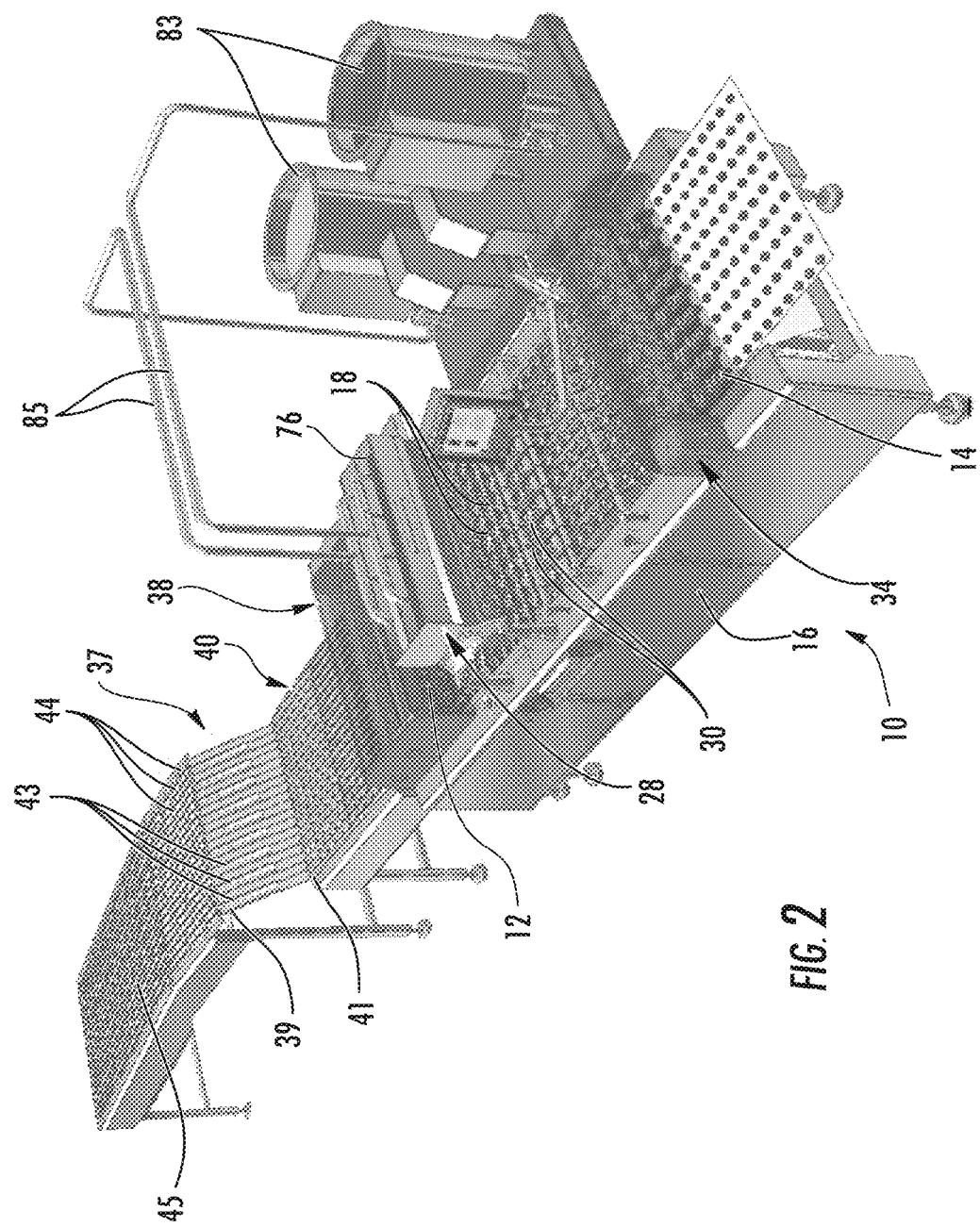
FIG. 2 is a perspective view of an apparatus for the production of sandwich food items in accordance with another embodiment of the present invention.

Referring now to the figures, FIGS. 1 and 2 illustrate an apparatus 10 for the continuous production of sandwich food items. Generally, apparatus 10 includes an input end 12, a deposit end 14, and a frame structure 16 that houses a plurality of continually rotating horizontal row conveyers 18 and a plurality of carrying mechanisms 20 that extend from input end 12 to deposit end 14. Apparatus 10 further includes a depositing mechanism 28, a series of bowed arms 30 and braces 32, and a compression mechanism 34. These elements, the depositing mechanism 28, the plurality of bowed arms 30 and braces 32, and the compression mechanism 34, may be connected to frame structure 16 at a position above the plurality of row conveyers 18 as more clearly explained below.

Figure 3:
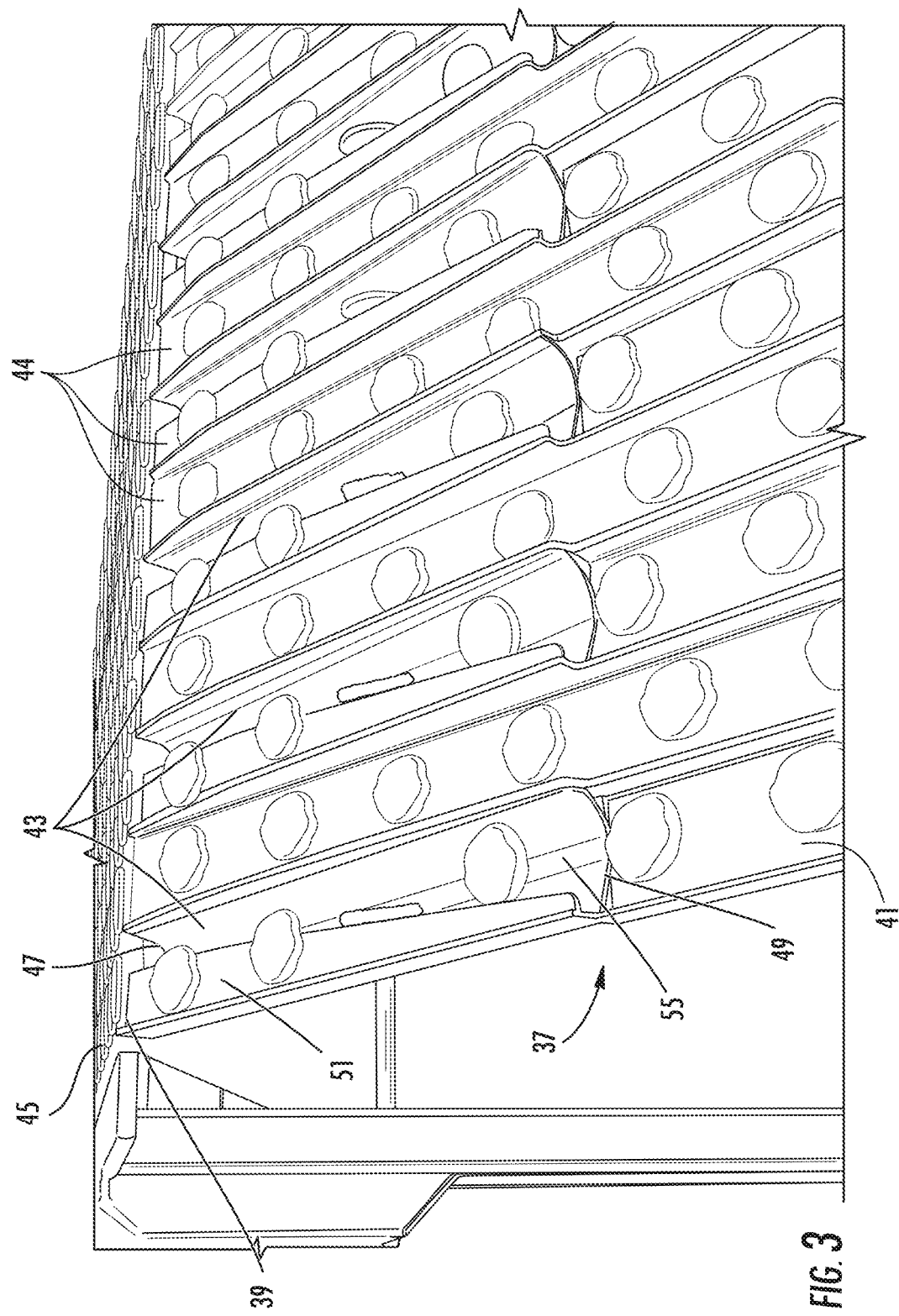
FIG. 3 is a partial perspective view of a channel board attached to a conveyer in accordance with the embodiment of the present invention illustrated in FIG. 2.

Row conveyers 18 may be adapted to receive one or more rows of food items 36 and transport them from input end 12 to deposit end 14 of apparatus 10. In some embodiments, as illustrated in FIGS. 2 and 3, every other food item of a row 36 may be inverted 180° prior to entering input end 12 of apparatus 10. This may be accomplished by inverting alternating lanes 44 of food items with the use of a channel board 37 that includes a first end 39, a second end 41, and a series of alternating tapered chutes 43. A conveyer 45 may be used to transport lanes 44 of food items from an adjacent oven or baking area (both not shown) toward channel board 37, first end 39. Channel board 37 may be constructed such that alternating lanes 44 of food items are forced to slide down tapered chutes 43 as well as channel board 37. As more clearly seen in FIG. 3, tapered chutes 43 may include a first end 47, a second end 49, a top portion 51, and a bottom portion 55. Top portion 51 of tapered chute 43 may have a width substantially equal to tapered chute 43 at first end 47 and the width may decrease as top portion 51 approaches second end 49. As a food item that is to be inverted reaches channel board 37 from conveyer 45, it is originally received by first end 47 and top portion 51 of taper chute 43. As the food item slides down tapered chute 43, it is forced to partially invert as a portion of the food item is no longer upheld by top portion 51. The partial inversion of the food item forces it to fully invert as it moves further down chute 43 until it is fully received by bottom portion 55 of tapered chute 43 as shown in FIG. 3.

Although food items may be inverted in the manner discussed above, in other embodiments of the invention, any apparatus known in the art may be utilized for inverting the desired food items. For example, a slide plate with a pivot shaft may be utilized to invert every other food item as discussed in U.S. Pat. No. 4,098,909 to Mims, which is incorporated by reference herein.

Figure 4:
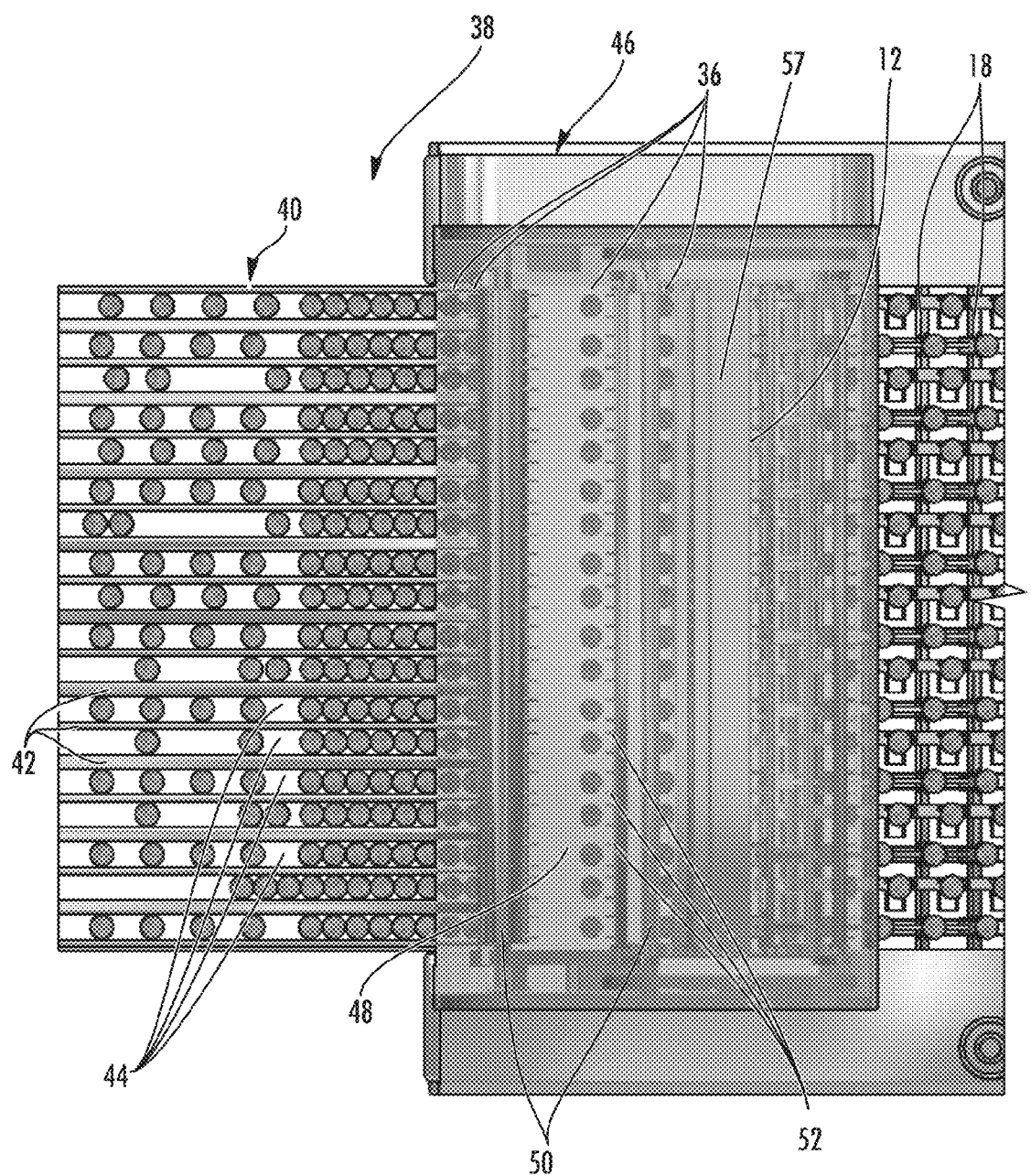
FIG. 4 is a partial top view of a feed and sorting mechanism attached to the apparatus of FIG. 1 in accordance with an embodiment of the present invention.

In further embodiments, as illustrated in FIGS. 1 and 2, apparatus 10 may include a feed and sorting mechanism 38 for properly supplying one or more rows 36 of food items to row conveyers 18. As shown in FIG. 1, feed and sorting mechanism 38 is located proximate input end 12 of apparatus 10 and includes a feeding tray 40. In some embodiments, as illustrated in FIGS. 1, 2 and 4, feeding tray may be adapted with sleeves 42 to receive and maintain lanes 44 of food items from channel board 37 or another source including an oven or baking area (both not shown). In the particular embodiments illustrated in the figures, feeding tray 40 is divided into eighteen different lanes of food items 44. However, feeding tray 40 may be constructed to accommodate any number of lanes to meet the user's specifications. For example, feeding tray 40 may be divided into ten, twelve, fourteen, or sixteen lanes.

Feed and sorting mechanism 38 may also include a sorter 46 which may be utilized to create one or more rows of food items 36 that contain a food item from one or more lanes 44. As illustrated in FIG. 4, sorter 46 includes a conveyer 48 and a plurality of rotating cylindrical rods 50, each with a series of prongs 52. As food items are carried by conveyer 48, rods 50 rotate and prongs 52 make occasional contact with each food item to push them into a properly aligned row. As will be recognized by those of ordinary skill in the art, the speed of rotation of conveyer 48 and rotating rods 50 may be altered to meet the production speed of the sandwich food items.

After rows 36 of food items are properly aligned, they exit conveyer 48 and are driven down a declined plane 57, where rows 36 may then be received by row conveyer 18. In some embodiments, as more clearly seen in FIG. 5, row conveyer 18 may be constructed of a horizontal rail 54 that includes a first end 56 and a second end 58 and is releasibly connected to simultaneously rotating chains 60 located within frame structure 16. Simultaneously rotating chains 60 may rotate within frame structure 16 from input end 12 to deposit end 14 and back to input end 12 in a continuous manner. The rotation of chains 60 may be accomplished by any means known in the art. For example, rotating chains may be connected to rotating gears, located at input end 12 and deposit end 14, which are powered by a gear motor. The user's specification will dictate the manner in which the rotation is accomplished.

Figure 6:
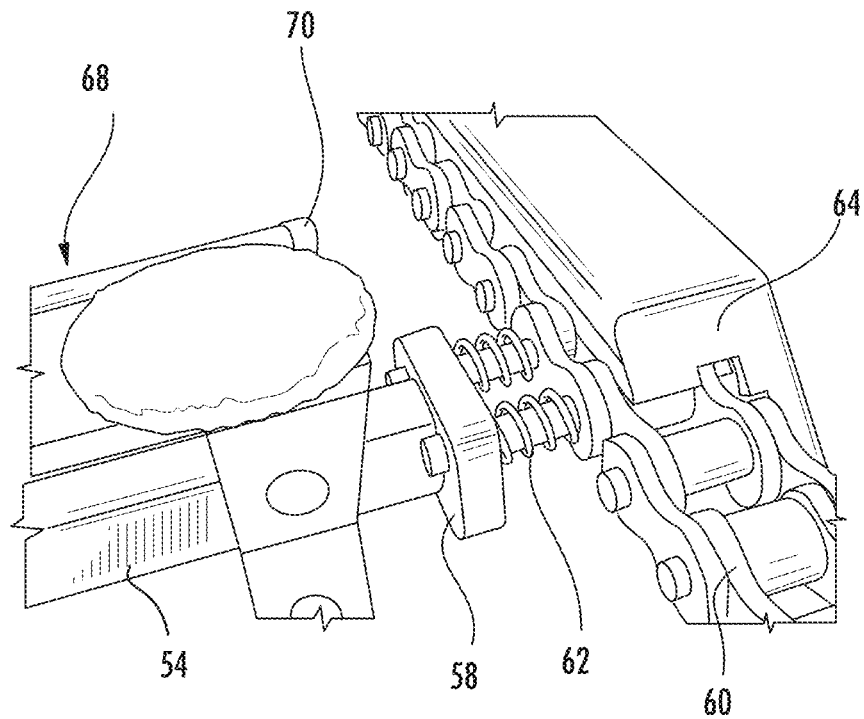
FIG. 6 is a partial perspective view of a row conveyer with food items connected to a rotating chain located within a frame structure in accordance with an embodiment of the present invention.
Figure 7:
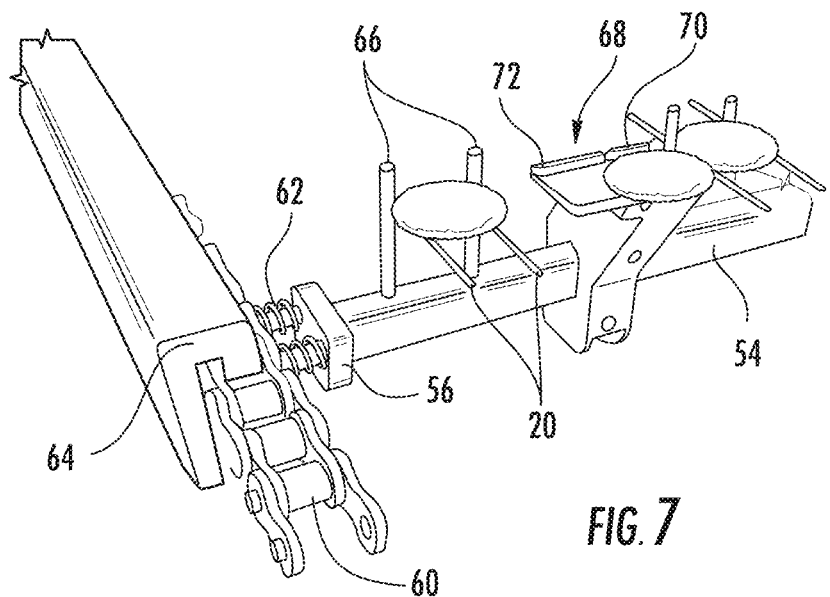
FIG. 7 is a partial perspective view of a row conveyer with food items connected to a rotating chain located within a frame structure in accordance with an embodiment of the present invention.

As seen in FIG. 6, in some embodiments, simultaneously rotating chains 60 may be positioned within a housing 64 that substantially encases chains 60 to ensure that no dirt or other contaminants from chains 60 infect the food items of row conveyers 18. Further, as seen in FIGS. 6 and 7, first and second ends 56, 58 of horizontal rail 54 may be connected to simultaneously rotating chains 60 with the use of spring loaded pins 62. Spring loaded pins 62 may help to ensure that horizontal rail 54 properly accommodates unexpected vibrations caused by the rotation of chains 60.

Figure 5:
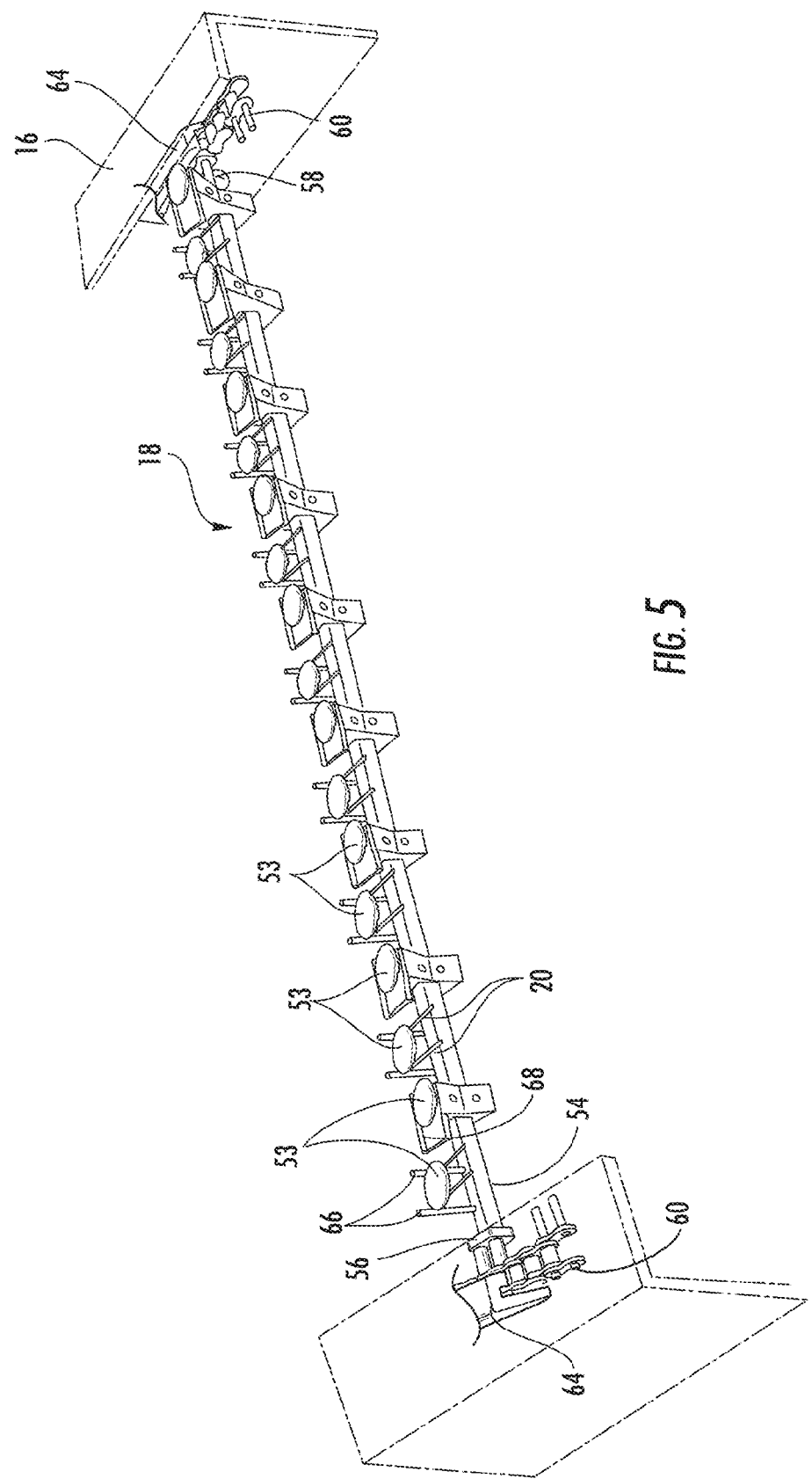
FIG. 5 is a perspective view of a row conveyer with food items connected to simultaneously rotating chains located within a frame structure in accordance with an embodiment of the present invention.

As seen in FIGS. 5 and 7, horizontal rail 54 also includes pairs of outwardly extending arms 66 and receiving plates 68 which may be adapted to transport food items from input end 12 to deposit end 14 of apparatus 10. In some embodiments, the number of pairs of outwardly extending arms 66 and receiving plates 68 of horizontal rail 54 is equivalent to the number of food items in row 36. Receiving plates 68 include a first end 70 and a second end 72 and, as shown in FIG. 7, may extend further in the direction of deposit end 14 than that of a pair of outwardly extending arms 66. In some embodiments, the rotation of chains 60 is timed such that as a non-inverted food item reaches the bottom of declined plane 57, it is deposited onto an approaching receiving plate 68 on its first end 70. In some embodiments, receiving plates 68 may be constructed to include an inclined plane in the direction of deposit end 14 when receiving plates 68 are positioned to receive a food item. Such a construction may aid in proper transportation of the food item and the production of sandwich food items as more fully discussed below. Receiving plate 68 may be connected to horizontal rail 54 by a spring loaded pin (not shown) to ensure ease of delivery of a food item as it is deposited upon receiving plate 68 from declined plane 57.

As shown in FIGS. 5 and 7, a pair of outwardly extending arms 66 may receive a carrying mechanism 20 of unitary structure 18 as arms 66 travel from input end 12 to deposit end 14. As shown in the figures, carrying mechanism 20 may be a pair of guide wires, however, in other embodiments, carrying mechanism 20 may be any structure that may be properly received by arms 66. In some embodiments, as an inverted food item reaches the bottom of declined plane 57, it falls onto a carrying mechanism 20. As row conveyer 18 continues rotation, outwardly extending arms 66 then receive carrying mechanism 20 and push inverted food item along carrying mechanism 20 toward deposit end 14, as shown in FIGS. 5 and 7.

Once food items are properly received by row conveyers 18, each row 36 of food items may be constructed of a number of adjacent complementary sets of food items 53 that may be used to complete a sandwich food item, as more fully discussed below. Each complementary set 53, as shown in FIG. 5, may be constructed of an inverted food item and an adjacent non-inverted food item.

Figure 8:
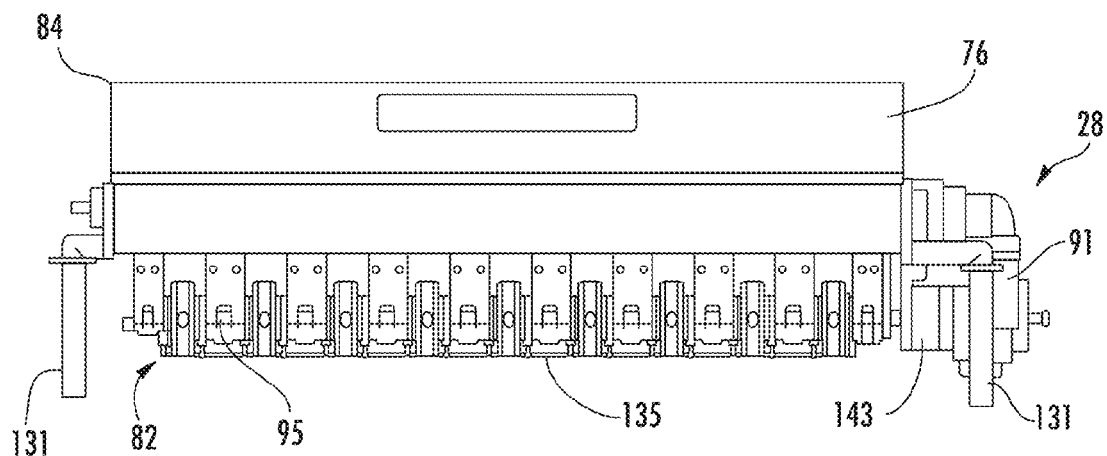
FIG. 8 is a front view of a depositing mechanism in accordance with an embodiment of the present invention.
Figure 9:
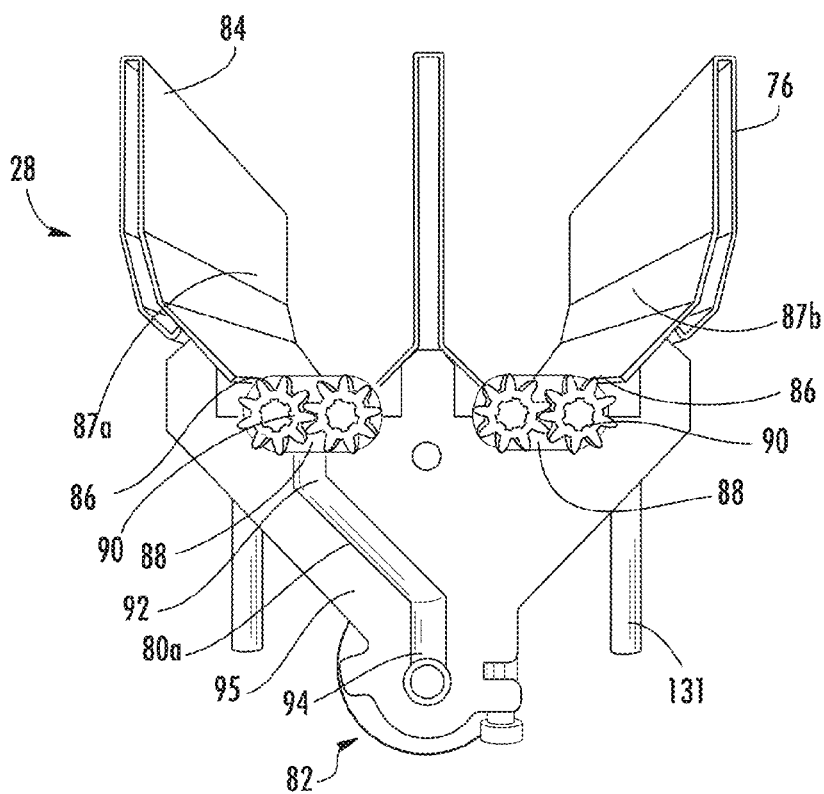
FIG. 9 is a side cross-sectional view of a depositing mechanism in accordance with an embodiment of the present invention.
Figure 10:
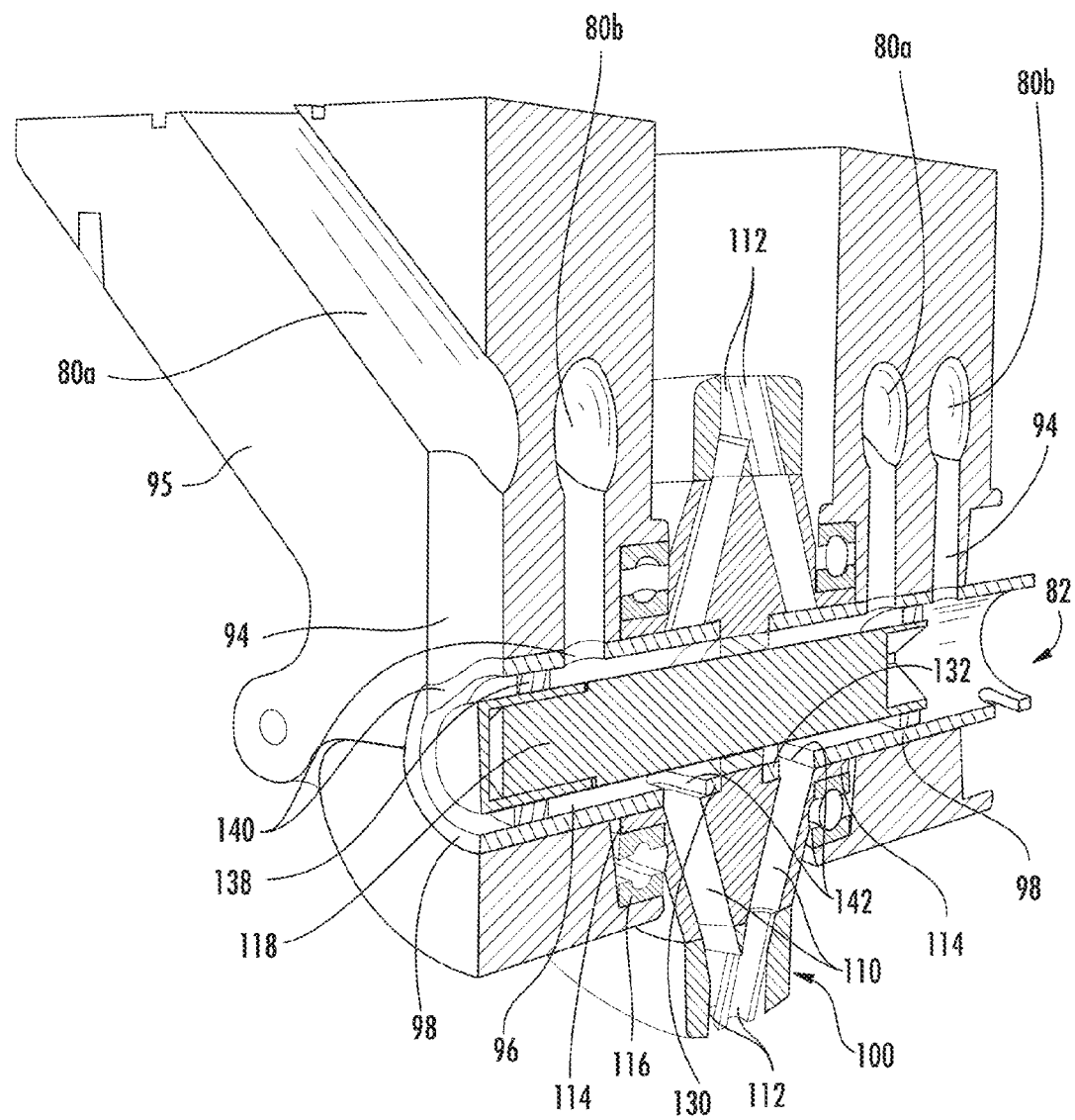
FIG. 10 is a partial perspective cross-sectional view of a housing connected to a depositing assembly in accordance with an embodiment of the present invention.

As row conveyers 18 rotate continually toward deposit end 14, food items received by row conveyers 18 approach depositing mechanism 28. Depositing mechanism 28 may be utilized to apply filler to a food item, such that a sandwiched food item can be created. As shown in FIGS. 8 through 10, depositing mechanism 28 is generally constructed of a hopper 76, a plurality of filler flow tubes 80a and 80b and a releasibly connected depositing assembly 82.

Hopper 76 includes a first end 84 and a second end 86. In some embodiments, first end 84 may be open to the air or contain a removable cover (not shown) so that a user may add more filler to depositing mechanism 28 to ensure the continual production of sandwich food items by apparatus 10. In some embodiments, as shown in FIG. 2, hopper 76 may receive additional filler from storage tanks 83 through deposit lines 85. Hopper 76 of FIG. 9 may include compartments 87a and 87b that are not in fluid communication with one another and may allow depositing mechanism 28 to apply two different types of filler onto a food item, depending on the filler utilized in each compartment. In other embodiments, a single compartment hopper may be utilized.

In some embodiments, hopper 76 may be jacketed with thermal insulation to maintain the temperature of the filler used. For example, if ice cream is used as filler, hopper 76 may include sufficient insulation or refrigeration piping/jacketing to maintain the filler at a temperature below 32° F. In other embodiments, hopper 76 may also include an agitator (not shown). An agitator may be used to maintain a desired consistency of filler to ensure that it may be properly dispensed through the depositing mechanism 28.

As seen in FIG. 9, second end 86 of hopper 76 includes a series of output chambers 88, each with a set of rotating gears 90. Each output chamber 88 is in fluid communication with a first end 92 of an individual filler flow tube 80a or 80b. Rotating gears 90 may be powered by pumps 91 (FIG. 8) and may assist in the directing and pushing of filler into filler flow tubes 80a and 80b. In some embodiments, the speed of rotation of rotating gears 90 may vary to provide a desired amount of filler into filler flow tube 80a and 80b. In further embodiments, rotating gears 90 may also be rotated in an opposite direction to pull filler back into hopper 76 in the instance where an excess of desired filler has been deposited into filler flow tubes 80a and 80b.

Figure 11:
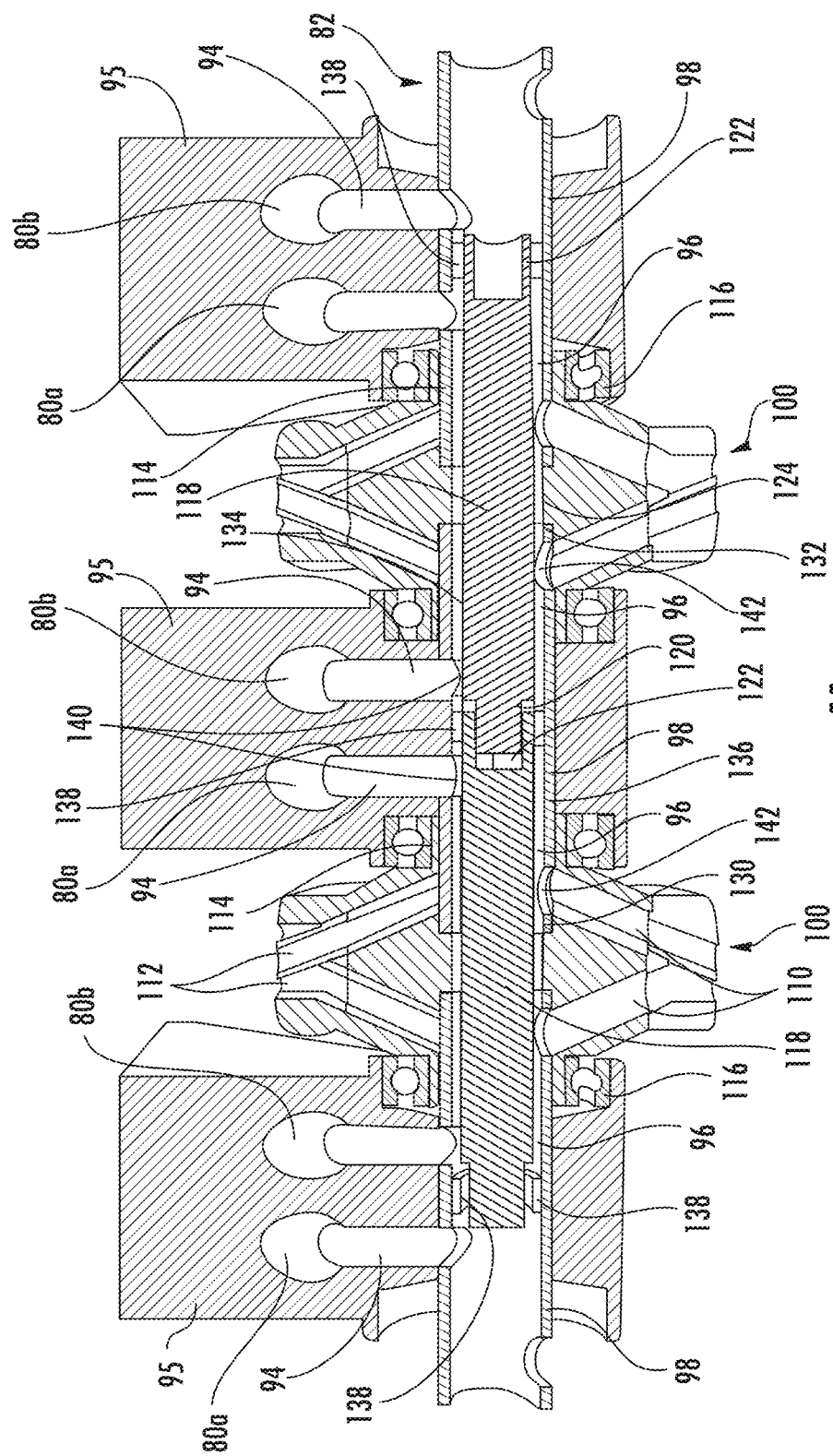
FIG. 11 is a partial front cross-sectional view of a housing connected to a depositing assembly in accordance with an embodiment of the present invention.

Individual filler flow tubes 80a or 80b receive filler from only one compartment 87 of hopper 76 and may be situated within housings 95 that extend downward to the center of releasibly connected depositing assembly 82, as shown in FIGS. 8 and 9. Individual filler flow tubes 80a or 80b within housings 95 alternate between individual filler flow tubes 80a that are in fluid communication with compartment 87a and individual filler flow tubes 80b that are in fluid communication with compartment 87b, as shown in FIGS. 10 and 11. Such a configuration may allow depositing mechanism 28 to supply two different types of filler to each food item.

The continued rotation of rotating gears 90 causes filler to move and exit out of a second end 94 of a filler flow tube 80a or 80b which is in fluid communication with an individual chamber 96 of releasibly connected depositing assembly 82 as shown in FIGS. 10 and 11. Releasibly connected depositing assembly 82 generally includes a plurality of individual chambers 96, filler pipes 98 and rotating deposit stencils 100.

Figure 12:
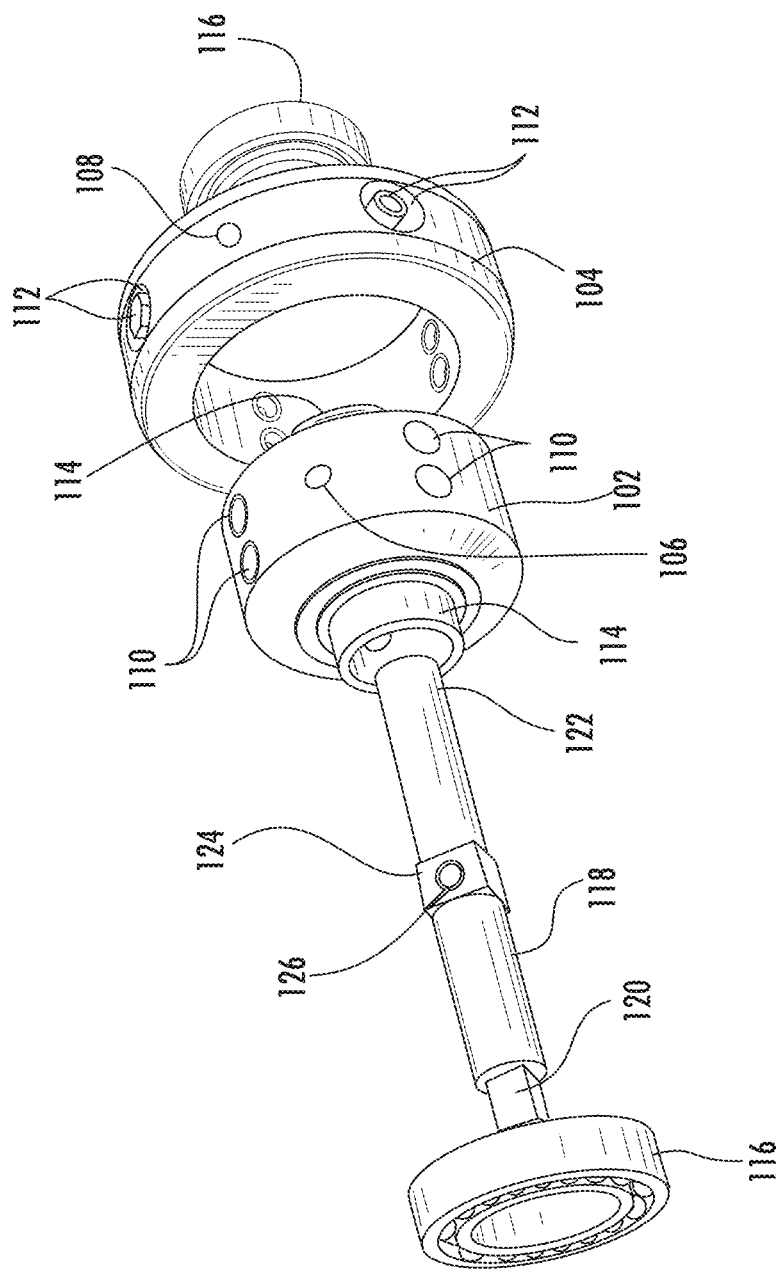
FIG. 12 is an exploded perspective view of a portion of a depositing assembly in accordance with an embodiment of the present invention.

Rotating deposit stencils may provide filler directly to a food item. As illustrated in FIGS. 10 through 12, rotating deposit stencils 100 include an inner ring 102 and an outer ring 104. Both rings 102, 104 contain corresponding bores 106, 108 that extend the entire radius of each ring 102, 104 as more clearly seen in FIG. 12. Inner ring 102 may include four pair of filler deposit tubes 110 that are located 90° apart from one another and that extend outwardly from the center of inner ring 102. Filler deposit tubes 110 are in fluid communication with corresponding pairs of decorative outputs 112 when inner ring 102 is properly aligned within outer ring 104, as shown in FIG. 10. Although FIG. 12 illustrates inner and outer rings 102, 104 with four pair of filler deposit tubes 110 and decorative outputs 112, those of ordinary skill in the art will recognize that any number may be utilized. For example, only two pair of filler deposit tubes 110 and decorative outputs 112 may be used.

Inner ring 102 further includes a pair of tabs 114 that extend outwardly from inner ring 102. Each tab 114 receives a ball bearing ring 116 and makes contact with inner ring 102 on one side of ball bearing ring 116 and may aid in the rotation of depositing stencil 100. As shown in FIG. 11, ball bearing ring 116 is further received on an opposite side by housing 95, again to aid in rotation of depositing stencil 100.

Each depositing stencil 100 is connected to one another by a plurality of rotatable drive shafts 118. Adjacent drive shafts 118 are interconnected as shown in FIG. 11 and the interconnection may allow the drive shafts 118 of releasibly connected depositing assembly 82 to operate in the same manner as a single shaft. As illustrated in FIGS. 11 and 12, drive shafts 118 include a first rectangular end 120, a second hollow end 122, and a stop 124 with a threaded bore 126 located intermediate first and second ends 120, 122. Drive shafts 118 may be positioned such that stop 124 is located within inner ring 102 and threaded bore 126 of stop 124 is in alignment with bores 106, 108 of inner and outer rings 102, 104. In some embodiments, in order to provide a secure connection between drive shaft 118 and inner and outer rings 102, 104, a screw may be inserted through bores 126, 106, 108.

As illustrated in FIG. 11, adjacent drive shafts 118 may be connected by fitting first rectangular end 120 of one drive shaft 118 into hollow second end 122 of an adjacent drive shaft 118. The hollow portion of second end 122 may also have a rectangular shape to properly receive first end 120 of an adjacent drive shaft 118. In other embodiments, first end 120 may contain a ball bearing (not shown) that extends outwardly from the rectangular shape and is biased by a spring (not shown) located internally within first end 120. In such embodiments, hollow second end 122 may also contain a detent (not shown) that aligns with ball bearing of first end 120 when first end 120 is received by second end 122. Such an embodiment may allow for the secure connection between adjacent drive shafts 118.

Figure 13:
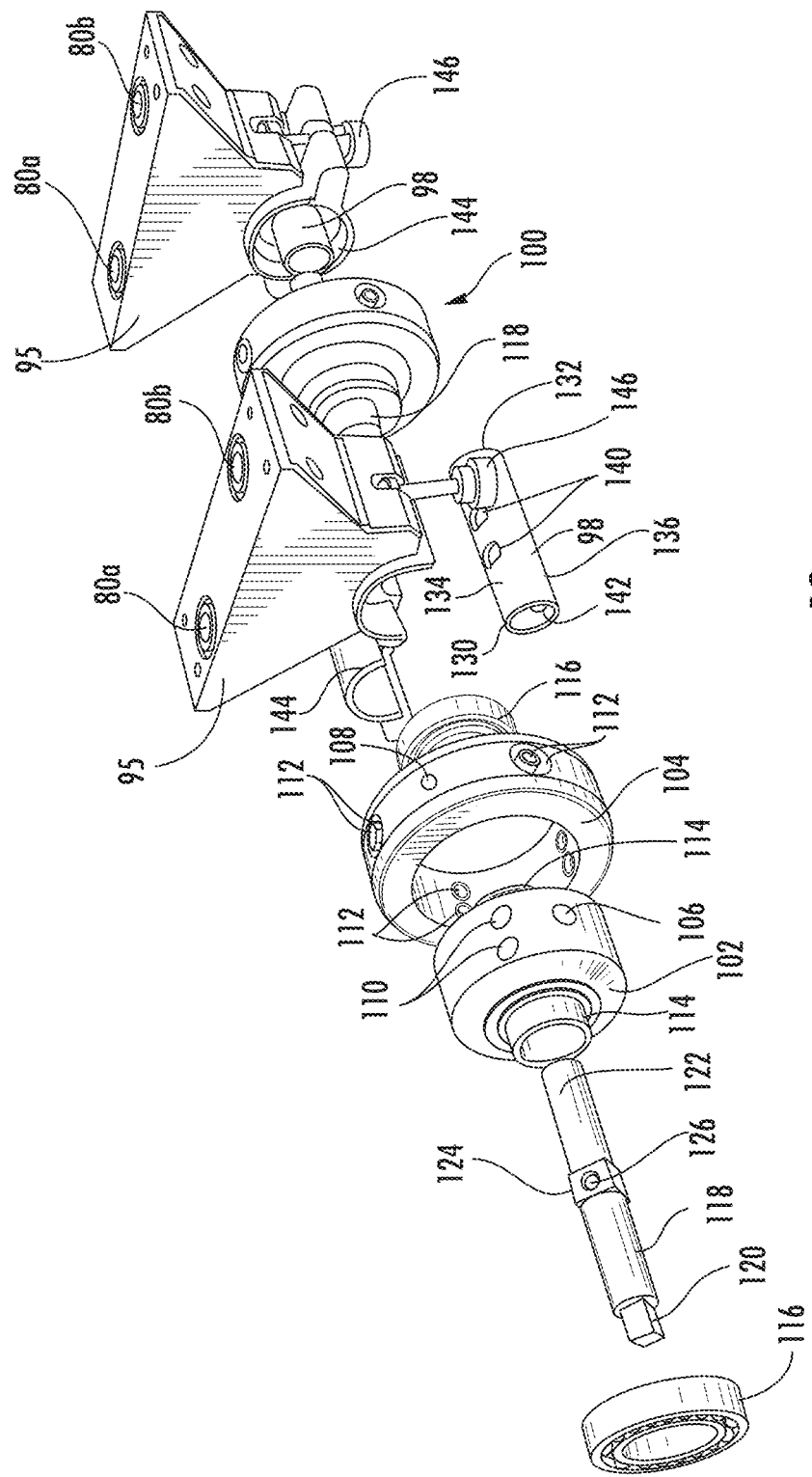
FIG. 13 is an exploded perspective view of housings and a portion of a depositing assembly in accordance with an embodiment of the present invention.

Adjacent drive shafts 118 are concentrically received by filler pipes 98 as illustrated in FIG. 11. As shown in FIGS. 11 and 13, filler pipes 98 include a first end 130, a second end 132, a top end 134 and a bottom end 136. Intermediate first and second ends 130, 132 is a stop ring 138 that may securely receive adjacent drive shafts 118 as illustrated in FIG. 11. Top end 134 and bottom end 136 each contain a set of holes 140, 142 as shown in FIG. 11. Holes 140 of top end 134 provide fluid communication between individual chambers 96 of filler pipes 98 with individual filler flow tubes 80a or 80b. Holes 142 of bottom end 136 provide selective fluid communication between an individual chamber and one filler deposit tube 110 and one decorative deposit 112 of each pair when inner and outer ring 102, 104 are properly aligned as shown in FIG. 11. First end 130 and second end 132 of filler pipe 98 may be received by inner ring 102 of adjacent depositing stencils 100, such that when adjacent drive shafts 118 are connected, a fluid pipe 98 is securely positioned between two depositing stencils 100.

In some embodiments, as shown in FIG. 8, depositing assembly 28 may further include adjustable legs 131 for attaching to frame structure 16. Adjustable legs 131 may aid in allowing depositing assembly 82 to be at an appropriate height such that it may accurately deposit filler onto a food item. In some embodiments, legs 131 may be attached to jacks (not shown) located within frame structure 16 and may be manually or automatically/electronically lifted or lowered based on the user's specifications.

Depositing assembly 82 may further include a harp 133, as shown in FIGS. 14 and 15, which may be utilized to cut excess filler deposited from decorative outputs 112. Harp 133 includes a cutting wire 135 that is positioned underneath depositing stencils 100 and extends to all depositing stencils 100. Cutting wire 135 is attached to harp arms 137 located between each depositing stencil 100, which are held in place by a bar 139 that extends the length of depositing mechanism 28. Adjustable beams 141 hold bar 139 in place over frame structure 16 and may be adjusted clockwise or counter clockwise so as to allow the user to properly position cutting wire 135.

In operation, releasibly connected depositing assembly 82 is attached to housings 95. In some embodiments, housings 95 may contain a series of hinged arms 144 that receive each filler pipe 98 of releasibly connected depositing assembly 82 as illustrated in FIG. 13. Hinged arms 144 may contain a screw 146 to aid in a quick secure and removal of releasibly connected depositing assembly 82. Depositing assembly 82 is positioned, as stated above, such that holes 140 of top end of filler pipe 98 are in fluid communication with filler flow tubes 80 of housing 95. This allows filler that is pushed out of second end 94 of filler flow tubes 80 to enter individual chambers 96. The filler of an individual chamber 96 will not mix with the filler from another individual chamber 96, as it is blocked by stop 124 of drive shaft 118 and stop ring 138 of filler pipe 98.

When properly aligned within housing 95, releasibly connected depositing assembly 82 may be utilized for deposing filler onto food items that are being transported by row conveyers 18. As illustrated in the figures, and as more clearly seen in FIG. 15, depositing stencils 100 are located directly above outwardly extending arms 66 so as to provide filler to inverted food items. It should be noted that although the figures illustrate filler being added to the inverted food items, in other embodiments, filler may be added to non-inverted food items. The user's specification will dictate the arrangement of the food items.

As an inverted food item passes underneath depositing stencils 100, drive shafts 118 are rotated counter clockwise by an interconnected gear motor 143, as shown in FIG. 8, that is attached to shafts 118. The rotation of drive shafts 118 causes inner and outer rings 102, 104 to also rotate in a counter clockwise direction until they reach a position such that a set of filler deposit tubes 110 and decorative outputs 112 are in fluid communication with holes 142 of filler tube 98. The rotation of rotating gears 90 and the pressure created by such rotation pushes filler out of filler deposit tubes 110 and decorative outputs 112 and onto an inverted food item. As seen in FIGS. 10 and 11, the alternating filler flow tubes 80a and 80b in housings 95 allow each depositing stencil 100 to deposit two different types of filler onto a food item.

As drive shafts 118 continue to rotate counter clockwise, the excess filler that hangs between the decorative outputs 112 and the inverted food item is cut by cutting wire 135. This allows the filler that is deposited on the inverted food item to be released and to be transported on an inverted food item by row conveyer 18.

The rotation of drive shafts may be timed such that as the next set of filler deposit tubes 110 and decorative outputs 112 are aligned with holes 142 of filler pipe 98, another inverted food item is positioned underneath depositing stencils 100 allowing it to receive filler.

Based on the construction and operation of releasibly connected depositing assembly 82, any number of depositing stencils 100 may be utilized to meet the user's specifications. Further, every depositing stencil 100 may be rotated using a single gear motor 143 based on the construction and interconnection of adjacent drive shafts 118. For example, releasibly connected depositing assembly 82 may be constructed of ten filler tubes 98 and nine rotating depositing stencils 100 and may be rotated by a single gear motor 143 as illustrated in FIG. 8. In some embodiments, the total number of rotating depositing stencils 100 may equal the number of complementary sets 53 in row 36.

In a further embodiment, releasibly connected depositing assembly 82' may be constructed of fully connected filler pipes 98' and depositing stencils 100' as illustrated in FIGS. 16 and 17. In contrast to the earlier described embodiment, filler pipes 98' are rotatable as they are welded to depositing stencils 100', and drive shafts 118 and stop rings 138 may no longer be present. In the embodiment of FIGS. 16 and 17, stops 124' are placed within depositing stencils 100', between filler deposit tubes 110' and intermediate adjacent depositing stencils 100' within filler pipes 98'. In such an embodiment, releasibly connected depositing assembly 82' is connected to housing 95 in the same manner as described above and as illustrated in FIG. 17. In further contrast to the earlier described embodiment, however, individual chambers 96' are constantly in fluid communication with each set of filler deposit tubes 110', and holes 140' are in timed fluid communication with individual filler flow tubes 80' based on the rotation of depositing assembly 82'.

In operation, the releasibly connected depositing assembly 82' is connected to a gear motor (not shown), such that the entire assembly 82' rotates counter clockwise when the motor is activated. As filler enters individual chambers 96', it is passed into each set of filler deposit tubes 110' of depositing stencils 100'. Filler may then be deposited on an inverted food item as it passes under depositing stencil 100'.

Figure 18:
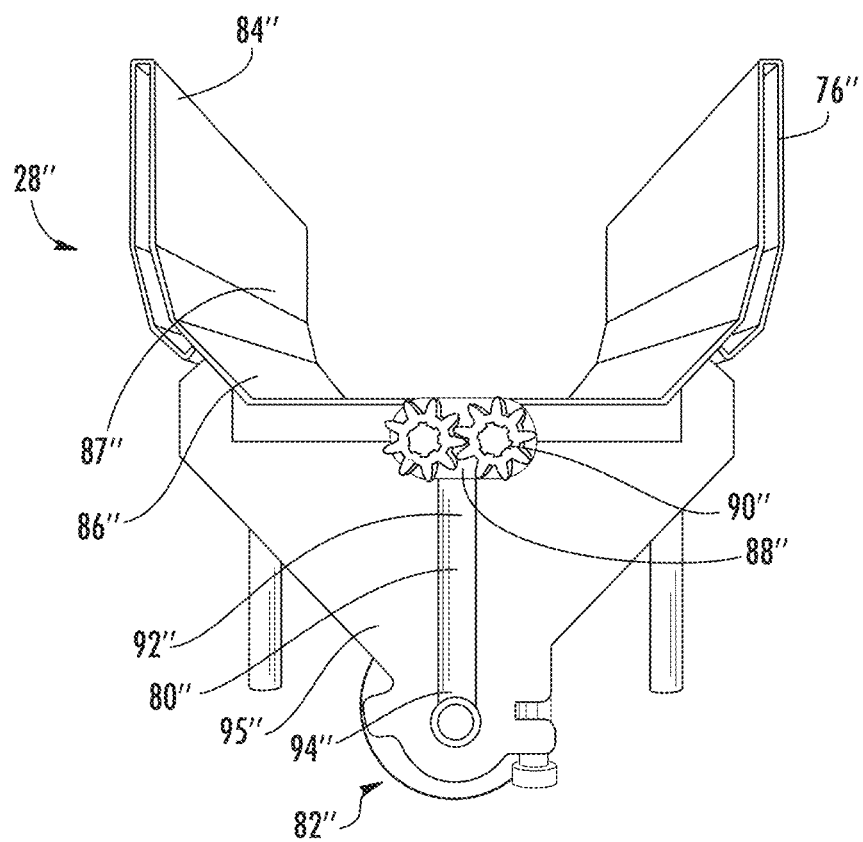
FIG. 18 is a side cross-sectional view of a depositing mechanism in accordance with a further embodiment of the present invention.
Figure 19:
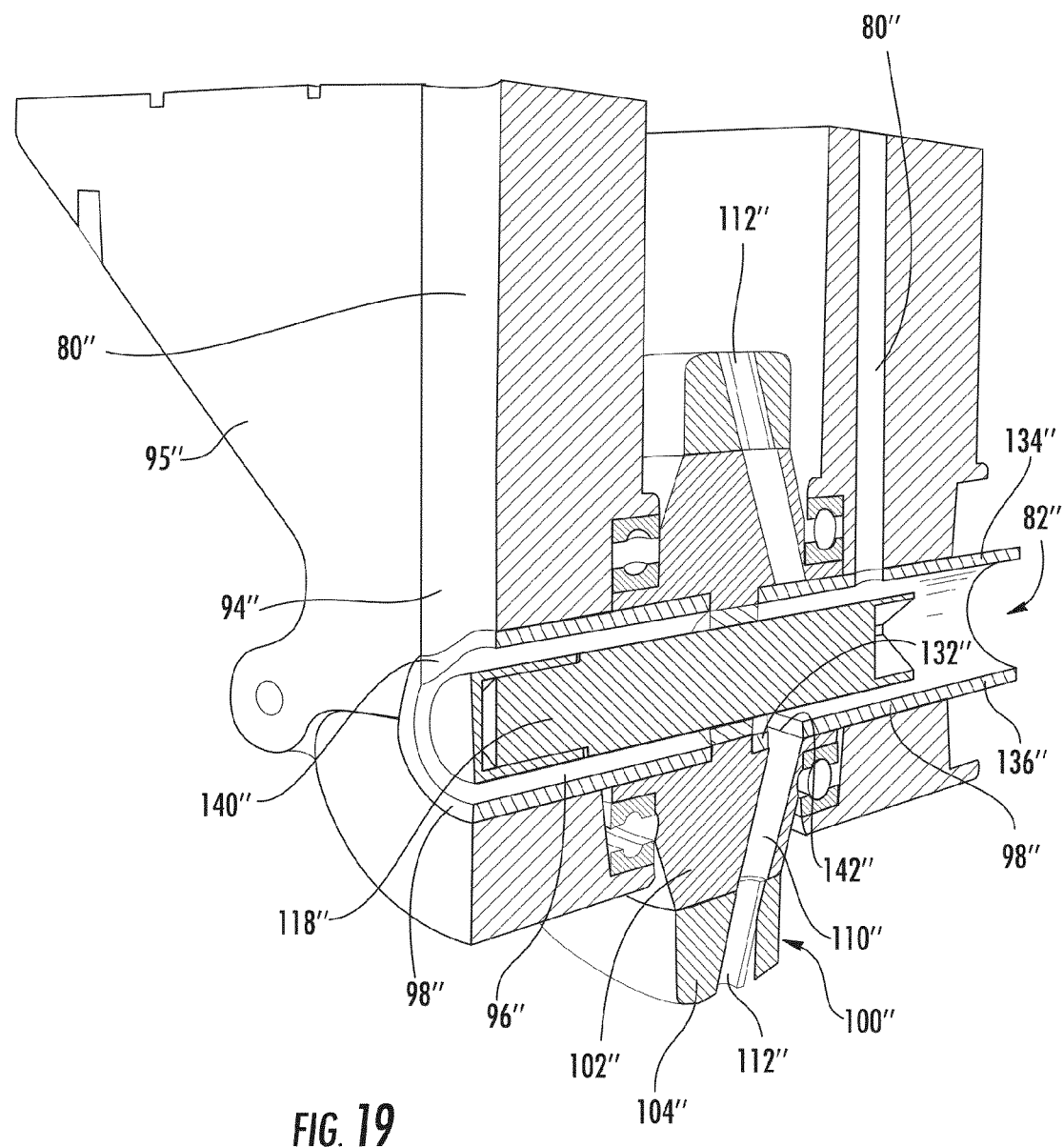
FIG. 19 is a partial perspective cross-sectional view of a housing connected to a depositing assembly in accordance with a further embodiment of the present invention.

In an additional embodiment as shown in FIGS. 18 and 19, depositing mechanism 28" may be adapted to deposit only one type of filler. In such embodiments, hopper 76" may include only a single compartment 87" for holding filler as shown in FIG. 18. As with the previously described embodiments, hopper 76" includes a plurality of output chambers 88" each with a set of rotating gears 90". Further, each output chamber 88" is in fluid communication with a first end 92" of an individual filler flow tube 80" as shown in FIG. 18, and a second end 94" of each individual filler flow tube 80" is in fluid communication with an individual chamber 96" as shown in FIG. 19.

In contrast to the embodiment illustrated in FIG. 10 and as shown in FIG. 19, housing 95" may only include one filler flow tube 80". In further contrast, stop rings 138 may be removed from filler pipes 98" and filler pipes 98" may include only a single hole, 140" and 142", on the filler pipes' 98" top end 134" and bottom end 136" respectfully as shown in FIG. 19. Additionally, in the embodiment of FIG. 19, inner ring 102" includes four individual filler deposit tubes 110" that are in fluid communication with four individual decorative outputs 112" of outer ring 104" when inner and outer ring 102" and 104" are properly aligned.

In operation, the releasibly connected depositing assembly 82" is connected to a gear motor (not shown), such that rotating depositing stencils 100" and drive shafts 118 rotate counter clockwise when the motor is activated. The rotation causes selective fluid communication between individual chambers 96" and the individual filler deposit tubes 110" and decorative outputs 112" through hole 142" on a filler pipe's 98" bottom end 136". When there is proper fluid communication, a single type of filler may be deposited on an inverted food item as it passes under depositing stencil 100".

Figure 21A:
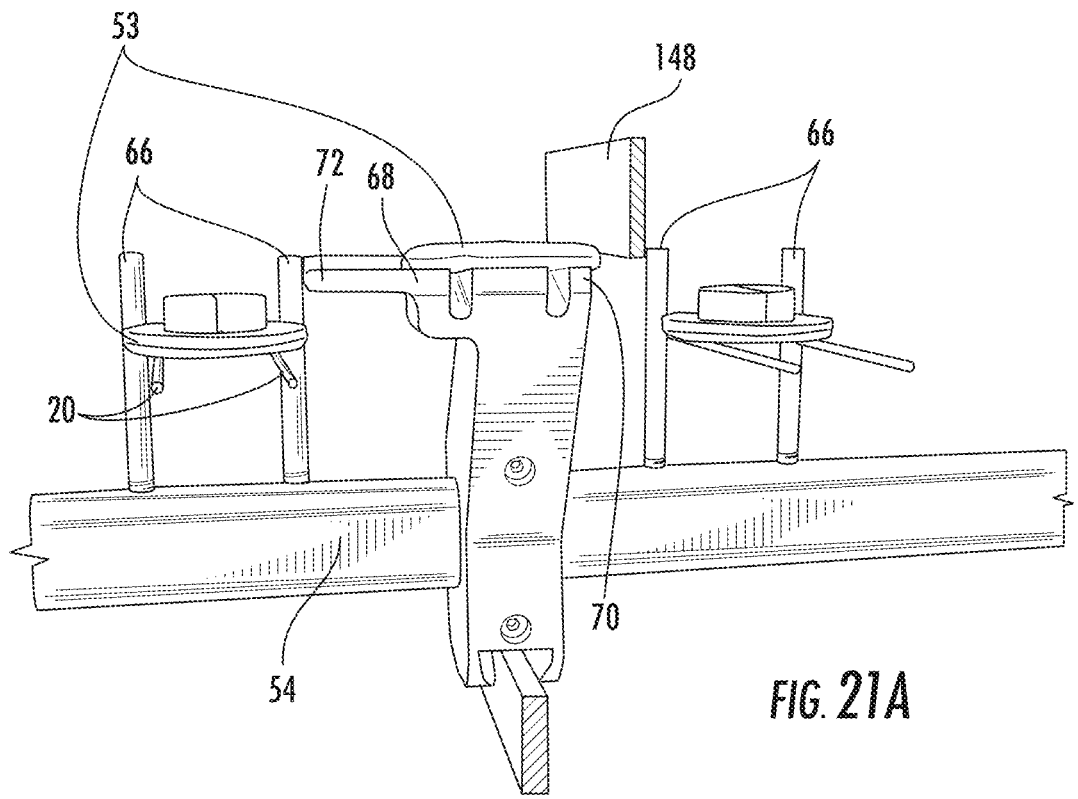
FIG. 21A is a partial perspective view of a row conveyer with food items where a receiving plate is received by a first end of a bowed arm in accordance with an embodiment of the present invention.
Figure 21B:
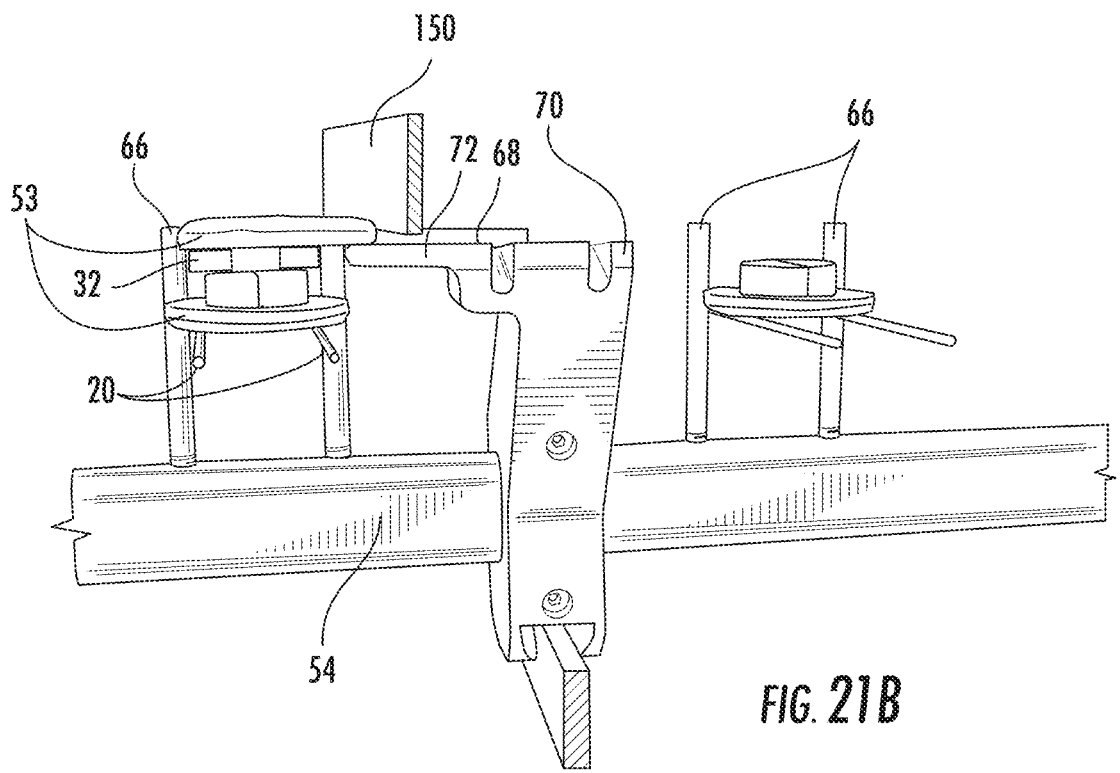
FIG. 21B is a partial perspective view of a row conveyer with food items where a receiving plate is received by a second end of a bowed arm in accordance with an embodiment of the present invention.
Figure 21C:
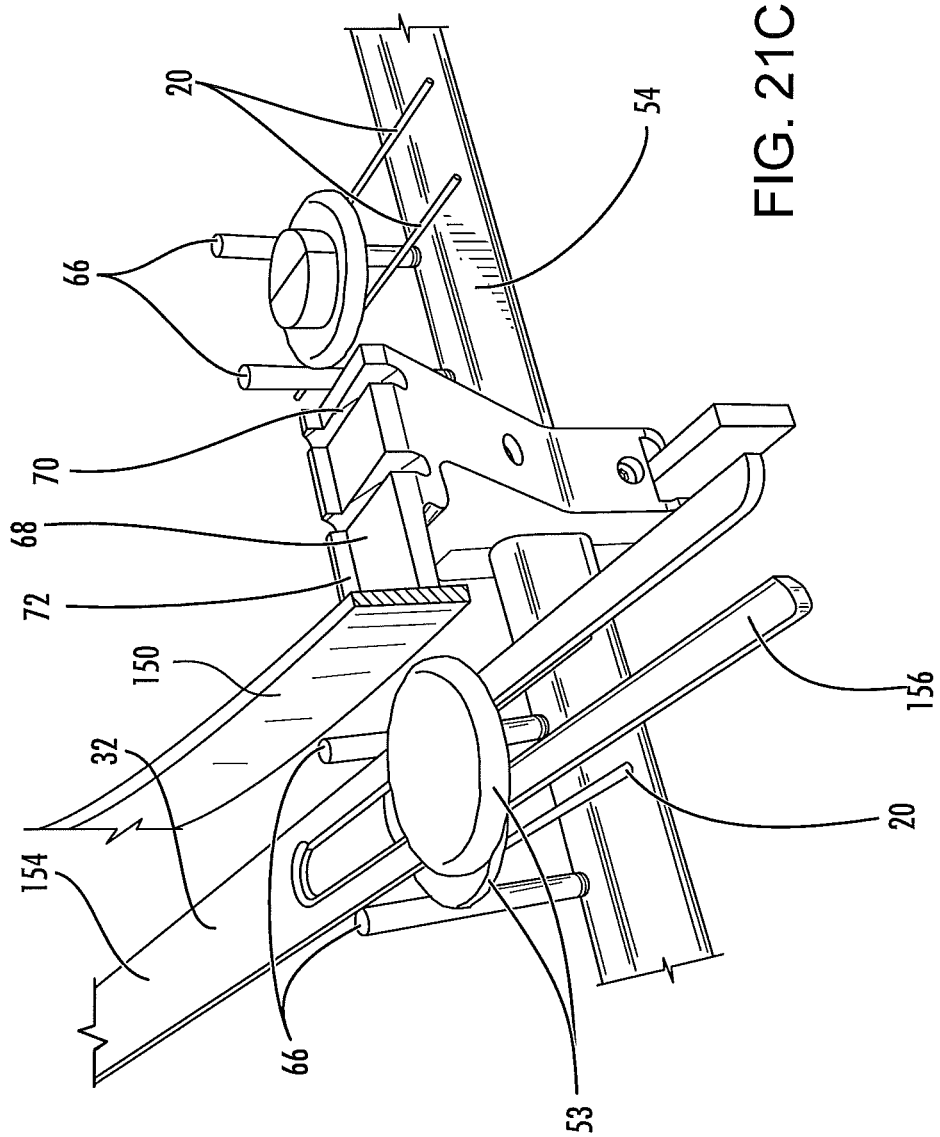
FIG. 21C is a partial perspective view of a row conveyer with food items where a food item has been received by a forked tongue in accordance with an embodiment of the present invention.

After the desired filler has been deposited on the inverted food items, bowed arms 30 first make contact with receiving plates 68, first end 70 as row conveyers 18 continually move toward deposit end 14. As shown in FIG. 20, bowed arms 30 include a first end 148 and a second end 150 and are constructed with a curvature portion 152 in the direction of an inverted food item from a complementary set 53 when moving from first end 148 to second end 150 of bowed arm 30. Due to curvature portion 152, bowed arms 30 are received by first end 70 of receiving plate 68 first and are gradually received by second end 72 of receiving plate 68 as row conveyer 18 moves toward deposit end 14. As shown in FIGS. 21A through 21C, the construction of bowed arms 30 causes a non-inverted food item to be pushed from first end 70 of receiving plate 68 to second end 72 of receiving plate 68 until non-inverted food item is pushed off of receiving plate 68 and onto a brace 32. As shown in FIGS. 20 and 21A through 21C, curvature 152 may have a gradual curve to ensure that a food item is not pushed off a receiving plate too quickly so as to interrupt the production of the apparatus 10.

Figure 22:
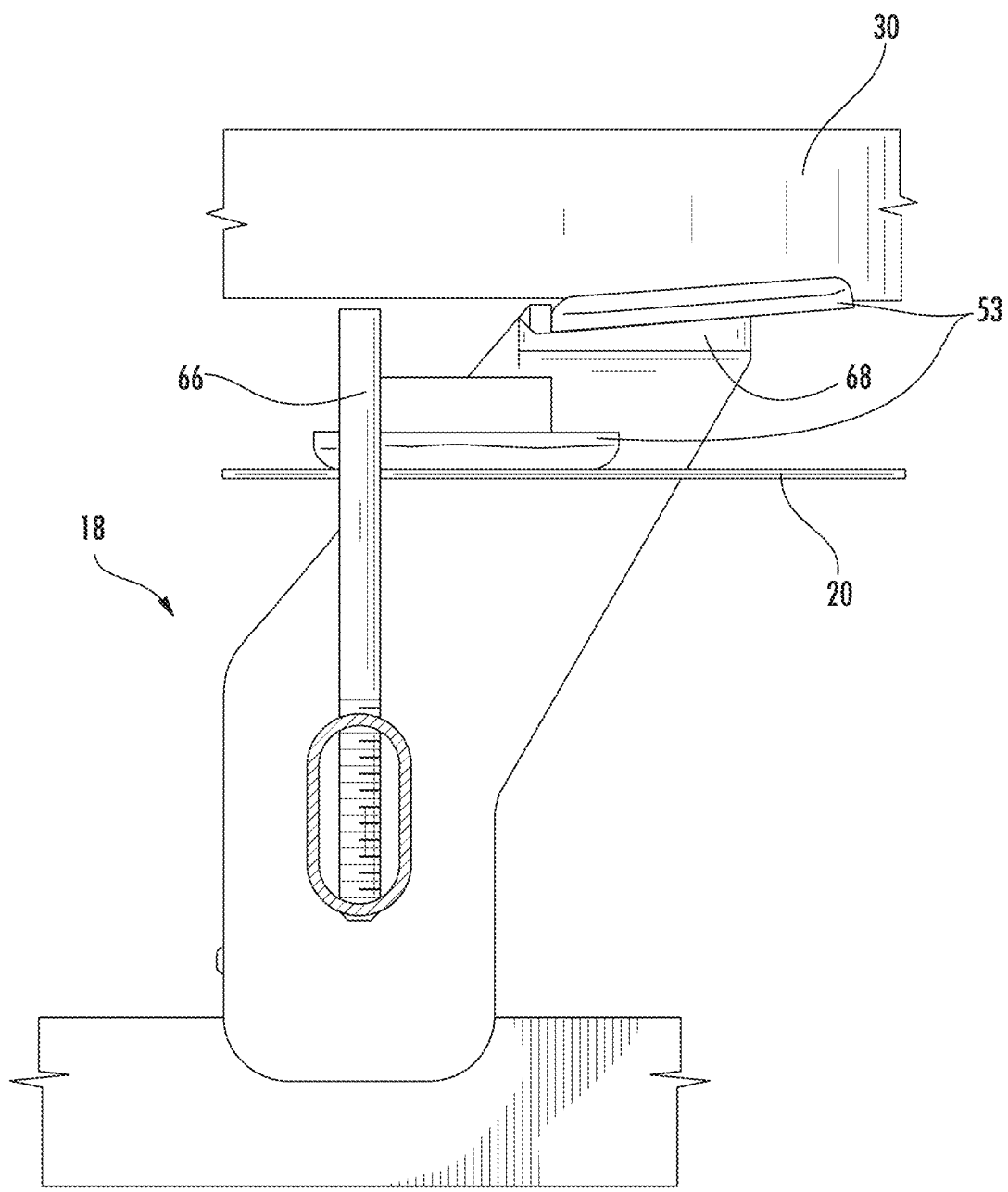
FIG. 22 is a side cross-sectional view of a receiving plate of the present invention that has received a food item.

In the embodiments where receiving plate 68 includes an inclined plane, as discussed above, bowed arms 30 may be received by receiving plates 68 without making actual contact with the receiving plates 68 themselves. As shown in FIG. 22, bowed arms 30 may only make contact with a food item as the food item is pushed off of receiving plate 68. By avoiding physical contact between bowed arms 30 and receiving plate 68, a user may avoid potential risks of disruptions or stoppages in the continuous production by apparatus 10.

Brace 32 includes a first end 154 and an opposite second end 156. Braces 32 are positioned directly above carrying mechanism 20 and may be received by outwardly extending arms 66 of row conveyers 18 in the same manner as carrying mechanism 20. In some embodiments, braces 32, as shown in FIG. 20, may have a forked second end. Non-inverted food items may be originally received by first end 154 of brace 32 and are eventually pushed toward second end 156 by outwardly extending arms 66. Because receiving plate 68 is generally positioned closer to deposit end 14 than outwardly extending arms 66, non-inverted food item typically reaches first end 154 of brace 32 prior to outwardly extending arms 66 as shown in FIG. 21C. Such a construction may ensure that non-inverted food items maintain the continuous movement of row conveyer 18 and are not accidentally placed behind outwardly extending arms 66, causing a disruption in apparatus 10.

While a non-inverted food item is located on brace 32, outwardly extending arms 66 of row conveyers 18 may push both non-inverted food items and inverted food items until non-inverted food item is pushed off of second end 156 of brace 32 and situated onto the filler of inverted food item, thus creating a sandwich food item. In some embodiments, brace 32 may contain a downward slope from first end 154 to second end 156 such that the transition of the non-inverted food item on to the top of the filler is more easily and properly accomplished.

Figure 23:
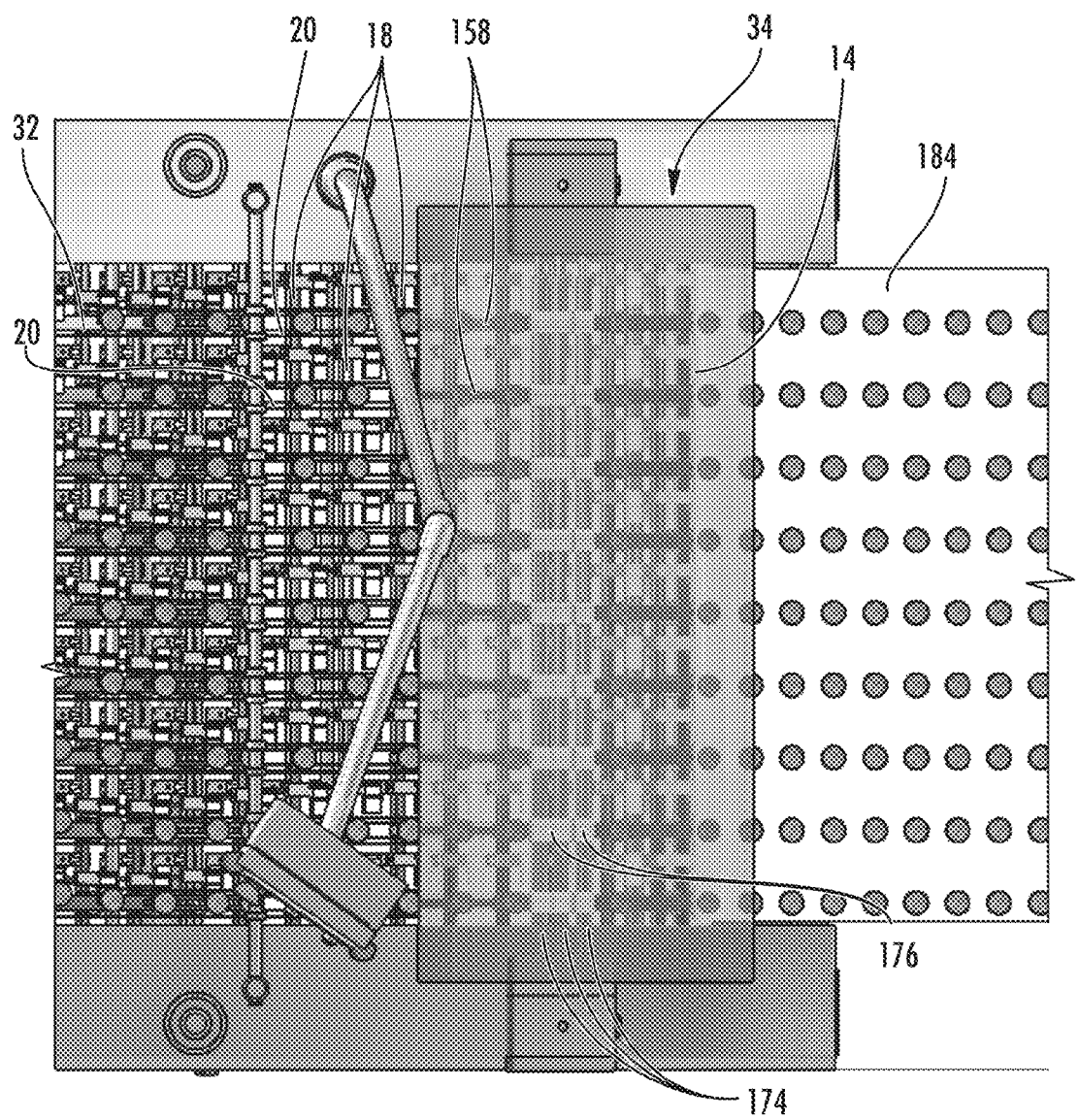
FIG. 23 is a top view of a compression mechanism of an apparatus for the production of sandwich food items in accordance with an embodiment of the present invention, where the top of compression mechanism is partially transparent.

As row conveyers 18 continue to move toward deposit end 14, outwardly extending arms 66 push newly formed sandwich food items atop an adjustable set of guide brackets 158 as shown in FIGS. 23 and 24. Guide brackets 158 include a first end 160 and a second end 162 and may be of appropriate width to receive outwardly extending arms 66 such that outwardly receiving arms 66 push sandwich food items while they are atop guide brackets 158 as shown in FIG. 24.

Referring now to FIG. 25, guide brackets 158 may be connected to a first end 166 of guide levers 164. Guide levers 164 may also include a second end 168 and a hollow tube 170 located proximate first and second ends 166, 168 of guide lever 164. Hollow tube 170 receives a bar 172 that allows guide levers 164 to be pivotable about bar 172. Guide brackets 158 may be adjustable by rotating second end 168 of guide levers 164 in either a clockwise or counter-clockwise direction, allowing guide bracket 158 to move in a vertical direction. The adjustment of guide brackets 158 may allow for apparatus 10 to accommodate any size sandwich food item.

As sandwich food items are pushed atop and along guide brackets 158, they reach compression mechanism 34. Compression mechanism 34, as shown in FIG. 25, may be constructed of a plurality of rotating supports 174 located within a center portion 178 of a plurality of compression pads 176. Rotating supports 174 may be constructed of rods as shown in FIG. 25, and may be releasibly connected to a set of rotating gear motors 177 to provide constant rotation of supports 174. Each compression pad 176 may include a slotted top end 180 and an inverse slotted bottom end 182 and rotate in a circular direction. In some embodiments, rotating members 174 are timed such that compression pads 176 make contact with each sandwich food item as it is passed along guide brackets 158. Compression pads 176 may be configured such that when they make contact with the sandwich food item, they provide equal pressure to the entire area of non-inverted food item as shown in FIG. 24.

In operation, after a compression pad 176 has applied pressure to a sandwich food item, the continued rotation of rotating supports 174 causes the slotted top end 180 of one compression pad 176 to be passed through by inverse slotted bottom end 182 of an adjacent compression pad 176 as shown in FIGS. 26A through 26G. Such a configuration may be used to clean the inverse slotted bottom end 182 of food remnants left by bottom end's 182 previous compression of a sandwich food item. The continual rotation of rotating members 174 will accordingly allow for the continued cleaning of bottom ends 182 by top ends 180 as compression pads 176 continue to rotate.

Once sandwich food items have been properly compressed and completed, outwardly extending arms 66 may push food items onto a conveyer 184 such that the food items may be transported to another area as shown in FIG. 23. For example, conveyer 184 may be utilized to transport completed sandwich food items to an area for packaging.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

The invention claimed is:

1. An apparatus for the continuous production of sandwich food items comprising:
   a. an input end adapted to supply a row of food items;
   b. a deposit end adapted to receive completed sandwich food items;
   c. a carrying mechanism extending from the input end to the deposit end;
   d. a row conveyer that is movable along a direction of travel from the input end to the deposit end and is adapted to receive the row of food items from the input end, the row conveyer comprising a rail that is disposed transverse to the direction of travel of the row conveyer, including:
      a receiving plate that has a first end and a second end, and
      an adjacent pair of outwardly extending arms including a first arm and a second arm that slidably receive the carrying mechanism therebetween;
   e. a depositing mechanism for applying filler to a food item;
   f. a bowed arm disposed above the row conveyor, the bowed arm including:
      a first end,
      a second end, and
      a curvature portion between the first end and the second end of the bowed arm;
   g. a brace located above the carrying mechanism such that the brace may be received between the first arm and the second arm of the pair of outwardly extending arms, the brace including:
      a first end adjacent to the second end of bowed arm, and
      a second end opposite the first end.

2. The apparatus of claim 1, further comprising a compression mechanism proximate the deposit end for applying pressure to sandwich food items.

3. The apparatus of claim 1, wherein the carrying mechanism comprises a pair of guide wires.

4. The apparatus of claim 1, wherein the outwardly extending arms extend upwardly from the rail of the row conveyer when the receiving plate is positioned for receiving a food item.

5. The apparatus of claim 1, wherein the brace has a forked second end.

6. The apparatus of claim 1, wherein the first end of the bowed arm passes above the first end of the receiving plate and the second end of the bowed arm passes above the second end of the receiving plate as the receiving plate moves in the direction of travel of the row conveyer.

7. An apparatus for the continuous production of sandwich food items comprising:
   a. an input end for supplying a row of food items;
   b. a deposit end for receiving completed sandwich food items;
   c. a carrying mechanism extending from the input end to the deposit end;
   d. a row conveyer that continuously cycles along a direction of travel from the input end to the deposit end and is adapted to receive the row of food items from the input end, the row conveyer comprising a rail that is disposed transverse to the direction of travel of the row conveyer, including:
      a pair of arms including a first arm and a second arm, the pair of arms extending upwardly from the rail and slidably receiving the carrying mechanism between the first arm and the second arm, and e. a depositing mechanism for applying filler to the sandwich food item, wherein a portion of the sandwich food item is urged along the carrying mechanism by the pair of arms as the row conveyor moves in the direction of travel from the input end to the deposit end.

8. The apparatus of claim 7, further comprising a receiving plate that has a first end and a second end, the receiving plate extending upwardly from the rail.

9. The apparatus of claim 7, further comprising a bowed arm disposed above the rail conveyor, the bowed arm comprising a first end, a second end and a curvature portion extending between the first end and the second end of the bowed arm, wherein the receiving plate passes under the bowed arm as the row conveyor moves in the direction of travel from the input end to the deposit end.

10. The apparatus of claim 9, further comprising a brace located above the carrying mechanism such that the brace is received between the first and second arms, the brace comprising:
    a first end adjacent to the second end of bowed arm, and
    a second end opposite the first end.

11. The apparatus of claim 7, further comprising a compression mechanism proximate the deposit end for applying equal pressure to sandwich food items.

12. The apparatus of claim 7, wherein the carrying mechanism comprises a pair of guide wires.

13. The apparatus of claim 7, wherein the receiving plate includes an inclined slope in the direction of the deposit end when adapted to receive a food item.

\* \* \* \* \*